(12) United States Patent
Wu

(10) Patent No.: US 12,445,837 B2
(45) Date of Patent: Oct. 14, 2025

(54) KEY OBTAINING METHOD AND COMMUNICATION APPARATUS

(71) Applicant: HUAWEI TECHNOLOGIES CO., LTD., Shenzhen (CN)

(72) Inventor: Yizhuang Wu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 214 days.

(21) Appl. No.: 18/309,567

(22) Filed: Apr. 28, 2023

(65) Prior Publication Data
US 2023/0319556 A1 Oct. 5, 2023

Related U.S. Application Data

(63) Continuation of application No. PCT/CN2020/125224, filed on Oct. 30, 2020.

(51) Int. Cl.
*G06F 21/00* (2013.01)
*H04W 12/041* (2021.01)
(Continued)

(52) U.S. Cl.
CPC ..... *H04W 12/0431* (2021.01); *H04W 12/041* (2021.01); *H04W 12/72* (2021.01)

(58) Field of Classification Search
CPC ........... H04W 12/0431; H04W 12/041; H04W 12/72; H04W 12/75; H04W 12/03;
(Continued)

(56) References Cited

U.S. PATENT DOCUMENTS 11,743,722 B2 * 8/2023 Ben Henda ........... H04W 12/06
455/411
2019/0223063 A1 7/2019 Palanigounder et al.
(Continued)

FOREIGN PATENT DOCUMENTS

CN 109842880 A 6/2019

OTHER PUBLICATIONS

3rd Generation Partnership Project; Technical Specification Group Services and System Aspects; Study on security Aspects of enhancement for proximity based services in the 5G System (5GS)(Release 17), 3GPP TR 33.847 V0.2.0, 45 pages, 3rd Generation Partnership Project, Valbonne, France (Oct. 26, 2020) (Year: 2020).*
(Continued)

*Primary Examiner* — Kendall Dolly
(74) *Attorney, Agent, or Firm* — Leydig, Voit & Mayer, Ltd.

(57) ABSTRACT

This application discloses a key obtaining method and a communication apparatus. A remote terminal device sends a first identifier and a relay service code to a relay terminal device. The first identifier is an identifier that is of the remote terminal device and that is corresponding to the relay service code, or the first identifier is an anonymous identifier of the remote terminal device. The remote terminal device generates, based on a first shared key, the relay service code, and at least one first freshness parameter, a root key for communication between the remote terminal device and the relay terminal device. A remote authentication service function network element is an authentication service function network element that serves the remote terminal device, and the first shared key is a key shared between the remote terminal device and the remote authentication service function network element.

29 Claims, 17 Drawing Sheets

(51) Int. Cl.
*H04W 12/0431* (2021.01)
*H04W 12/72* (2021.01)

(58) Field of Classification Search
CPC ............... H04L 9/0869; H04L 2209/42; H04L 2209/76; H04L 2209/805
See application file for complete search history.

(56) References Cited

U.S. PATENT DOCUMENTS

2019/0335332 A1 10/2019 Ying et al.
2022/0109996 A1* 4/2022 Lee ...................... H04W 76/14

OTHER PUBLICATIONS

"3rd Generation Partnership Project; Technical Specification Group Services and System Aspects; Study on system enhancement for Proximity based Services (ProSe) in the 5G System (5GS)(Release 17)," 3GPP TR 23.752 V0.5.1, Total 162 pages (Oct. 2020).

"3rd Generation Partnership Project; Technical Specification Group Services and System Aspects; 3GPP System Architecture Evolution (SAE); Security architecture (Release 16)," 3GPP TS 33.401 V16.3.0, Total 170 pages, 3rd Generation Partnership Project, Valbonne, France (Jul. 2020).

"3rd Generation Partnership Project; Technical Specification Group Services and System Aspects; Security architecture and procedures for 5G system (Release 15)," 3GPP TS 33.501 V15.10.0, Total 192 pages, 3rd Generation Partnership Project, Valbonne, France (Sep. 2020).

"3rd Generation Partnership Project; Technical Specification Group Services and System Aspects; Security aspects of 3GPP support for advanced Vehicle-to-Everything (V2X) services (Release 16)," 3GPP TS 33.536 V16.1.0, Total 23, pages, 3rd Generation Partnership Project, Valbonne, France (Sep. 2020).

"3rd Generation Partnership Project; Technical Specification Group Services and System Aspects; Study on security aspects of enhancement for proximity based services in the 5G System (5GS)(Release 17)," 3GPP TR 33.847 V0.2.0, Total 45 pages, 3rd Generation Partnership Project, Valbonne, France (Oct. 2020).

A.Dekok et al., "The Network Access Identifier," Request for Comments: 7542, Total 30 pages, Internet Engineering Task Force, Reston, Virginia (May 2015).

Samsung, "Solution for key management in 5G ProSerelay communication," 3GPP TSG-SA3 Meeting #100e, e-meeting, S3-201961, Total 4 pages, 3rd Generation Partnership Project, Valbonne, France (Aug. 17-28, 2020).

* cited by examiner

KEY OBTAINING METHOD AND COMMUNICATION APPARATUS

CROSS-REFERENCE TO RELATED APPLICATIONS

This application is a continuation of International Application No. PCT/CN2020/125224, filed on Oct. 30, 2020, the disclosure of which is hereby incorporated by reference in its entirety.

TECHNICAL FIELD

This application relates to the communication field, and in particular, to a key obtaining method and a communication apparatus.

BACKGROUND

With rapid development of mobile communication, universal use of new service types, for example, data services such as video chat and virtual reality (VR), increases a bandwidth requirement of a user. In device-to-device (D2D) communication, direct communication between terminal devices is allowed, and spectrum resources may be shared with cell users under control of a cell network, so that utilization of the spectrum resources is effectively improved.

When a terminal device is outside network coverage or a communication signal between the terminal device and a radio access network (RAN) network element is poor, the remote terminal device (Remote UE) may perform auxiliary communication through a relay terminal device (Relay UE). To be specific, the remote terminal device establishes a PC5 connection to the relay terminal device, and the relay terminal device establishes a connection to a mobile network, so that the remote terminal device establishes a connection to the mobile network via the PC5 connection and the relay terminal device, and obtains a service.

In an indirect communication connection establishment process, to ensure communication security, a security connection needs to be established between the remote terminal device and the relay terminal device. To be specific, data transmitted between the remote terminal device and the relay terminal device is encryption protected and/or integrity protected. Because the indirect communication connection is dynamically established on demand, shared security information (for example, a key) cannot be preconfigured between the remote terminal device and the relay terminal device. Consequently, the security connection between the remote terminal device and the relay terminal device cannot be established based on the preconfigured shared security information.

SUMMARY

Embodiments of this application provide a key obtaining method and a communication apparatus, to share a key between a remote terminal device and a relay terminal device.

To achieve the foregoing objective, the following technical solutions are used in embodiments of this application.

According to a first aspect, a key obtaining method is provided. The method includes: A remote terminal device sends a first identifier and a relay service code to a relay terminal device. The first identifier is an identifier that is of the remote terminal device and that is corresponding to the relay service code, or the first identifier is an anonymous identifier of the remote terminal device. The remote terminal device generates, based on a first shared key, the relay service code, and at least one first freshness parameter, a root key for communication between the remote terminal device and the relay terminal device. A remote authentication service function network element is an authentication service function network element that serves the remote terminal device, and the first shared key is a key shared between the remote terminal device and the remote authentication service function network element.

According to the key obtaining method provided in this embodiment of this application, the remote terminal device sends the first identifier and the relay service code to the relay terminal device. The first identifier is the identifier that is of the remote terminal device and that is corresponding to the relay service code, or the first identifier is the anonymous identifier of the remote terminal device. The remote terminal device generates, based on the first shared key, the relay service code, and the at least one first freshness parameter, the root key for communication between the remote terminal device and the relay terminal device. The first identifier is used by the remote AUSF network element to determine the corresponding first shared key, or is used by a PKMF network element to determine the corresponding second shared key. The second shared key is also generated based on the first shared key and/or the relay service code. In this case, the remote terminal device and the remote AUSF network element or the PKMF network element can generate, in a same manner, the root key for communication between the remote terminal device and the relay terminal device, to share the key between the remote terminal device and the relay terminal device.

In a possible implementation, the first identifier is a subscription concealed identifier SUCI of the remote terminal device. In an air interface transmission process, the SUPI of the remote terminal device is not exposed.

In a possible implementation, the method further includes: The remote terminal device obtains the first identifier.

In a possible implementation, that the remote terminal device obtains the first identifier includes: The remote terminal device sends the relay service code. The remote terminal device receives the first identifier corresponding to the relay service code. The first identifier corresponding to the relay service code may be obtained from the remote AUSF network element.

In a possible implementation, the method further includes: The remote terminal device generates a temporary identifier based on the first shared key and the relay service code. The remote terminal device obtains the first identifier based on the temporary identifier. A manner of generating the first identifier is disclosed in this implementation.

In a possible implementation, that the remote terminal device generates a temporary identifier based on the first shared key and the relay service code includes: The remote terminal device generates the temporary identifier based on the first shared key, the relay service code, and a second freshness parameter. A manner of generating the temporary identifier is disclosed in this implementation.

In a possible implementation, that the remote terminal device obtains the first identifier includes: The remote terminal device generates the first identifier based on a second freshness parameter, a route indication, and a home network identifier. A manner of generating the first identifier is disclosed in this implementation.

In a possible implementation, the method further includes: The remote terminal device sends the relay service code. The remote terminal device receives the second freshness parameter corresponding to the relay service code. The second freshness parameter may be from the remote AUSF network element, and is used to generate the first identifier. The second freshness parameter may be a random number generated by the remote AUSF network element or a value of a counter locally maintained by the remote AUSF network element.

In a possible implementation, the second freshness parameter is a value of a counter locally maintained by the remote terminal device. When the remote AUSF network element and the remote terminal device separately locally maintain their respective counters, a same initial value and a same counting rule are used, so that the values of the two counters are consistent.

In a possible implementation, the first identifier includes the route indication and the home network identifier. In this case, the PKMF network element determines a UDM network element or the remote AUSF network element based on the route indication and the home network identifier.

In a possible implementation, the method further includes: The remote terminal device sends first verification information to the relay terminal device. The first verification information is generated based on a first temporary key and all or some information elements of a message carrying the first verification information, and the first temporary key is generated based on the first shared key. The first verification information is sent to the remote AUSF network element. After receiving the first verification information, the remote AUSF network element generates third verification information in a same manner as that of the remote terminal device. The remote AUSF network element compares the first verification information with the third verification information to verify the remote terminal device, to verify whether the remote terminal device is authorized to access a network through the relay terminal device to obtain a service.

In a possible implementation, the first temporary key is generated based on the first shared key and at least one of the following: the relay service code, a third freshness parameter, a second identifier of the remote terminal device, and the first identifier, and the third freshness parameter is generated by the remote terminal device. A manner of generating the first temporary key is disclosed in this implementation.

In a possible implementation, the method further includes: The remote terminal device sends second verification information to the relay terminal device. The second verification information is generated based on the first freshness parameter, the relay service code, and the first shared key. The second verification information is sent to the PKMF network element. After receiving the second verification information, the PKMF network element generates fourth verification information in a same manner as that of the remote terminal device. The PKMF network element compares the second verification information with the fourth verification information to verify the remote terminal device, to verify whether the remote terminal device is authorized to access a network through the relay terminal device to obtain a service.

In a possible implementation, the at least one first freshness parameter includes a first random number, and the method further includes: The remote terminal device sends the first random number to the relay terminal device. The first random number is sent to the remote AUSF network element or the PKMF network element.

In a possible implementation, the at least one first freshness parameter includes a second random number, and the method further includes: The remote terminal device receives the second random number from the relay terminal device. The second random number may be from the remote AUSF network element or the PKMF network element.

In a possible implementation, the at least one first freshness parameter is a value of a counter locally maintained by the remote terminal device. When the terminal device and one of the remote AUSF network element or the PKMF network element locally maintain their respective counters, a same initial value and a same counting rule are used, so that values of the two counters are consistent.

In a possible implementation, the first shared key is a key Kausf (or another key generated based on the key) negotiated between the remote terminal device and the remote authentication service function network element when the remote terminal device accesses a network.

In a possible implementation, that the remote terminal device generates, based on a first shared key, the relay service code, and at least one first freshness parameter, a root key for communication between the remote terminal device and the relay terminal device includes: The remote terminal device generates a second shared key based on the first shared key and the relay service code, and generates the root key based on the second shared key and the at least one first freshness parameter. The second shared key is a key shared between the remote terminal device and the proximity-based services key management function network element. The remote terminal device and the PKMF network element generate the root key in a same manner.

According to a second aspect, a key obtaining method is provided. The method includes: A remote authentication service function network element obtains a relay service code and one of a first identifier or a second identifier of a remote terminal device. The second identifier is a permanent identifier of the remote terminal device, and the first identifier is an identifier that is of the remote terminal device and that is corresponding to the relay service code. The remote authentication service function network element obtains a first shared key corresponding to the first identifier or the second identifier. The first shared key is a key shared between the remote terminal device and the remote authentication service function network element. The remote authentication service function network element generates, based on the first shared key, the relay service code, and at least one first freshness parameter, a root key for communication between the remote terminal device and a relay terminal device. The remote authentication service function network element sends the root key.

According to the key obtaining method provided in this embodiment of this application, the remote AUSF network element obtains the relay service code and one of the first identifier or the second identifier of the remote terminal device. The second identifier is the permanent identifier of the remote terminal device, and the first identifier is the identifier that is of the remote terminal device and that is corresponding to the relay service code. The remote AUSF network element obtains the first shared key corresponding to the first identifier or the second identifier. The first shared key is the key shared between the remote terminal device and the remote AUSF network element. The remote AUSF network element generates, based on the first shared key the relay service code, and the at least one first freshness parameter, the root key for communication between the remote terminal device and the relay terminal device. The remote AUSF sends the root key. The first identifier is used by the remote AUSF network element to determine a corresponding first shared key, so that the remote terminal device and the remote AUSF network element can generate, in a same manner, the root key for communication between the remote terminal device and the relay terminal device, to implement key sharing between the remote terminal device and the relay terminal device.

In a possible implementation, that a remote authentication service function network element obtains one of a first identifier or a second identifier of a remote terminal device includes: The remote authentication service function network element receives one of the first identifier or the second identifier of the remote terminal device. One of the first identifier or the second identifier of the remote terminal device may be from the remote terminal device or a PKMF network element.

In a possible implementation, that a remote authentication service function network element obtains one of a first identifier or a second identifier of a remote terminal device includes: The remote authentication service function network element generates a temporary identifier based on the first shared key and the relay service code. The remote authentication service function network element generates the first identifier based on the temporary identifier. A manner of generating the first identifier is disclosed in this implementation. After the first identifier is generated, the first identifier may be sent to the remote terminal device.

In a possible implementation, that the remote authentication service function network element generates a temporary identifier based on the first shared key and the relay service code includes: The remote terminal device generates the temporary identifier based on the first shared key, the relay service code, and a second freshness parameter. A manner of generating the temporary identifier is disclosed in this implementation.

In a possible implementation, that a remote authentication service function network element obtains one of a first identifier or a second identifier of a remote terminal device includes: The remote authentication service function network element generates the first identifier based on a second freshness parameter, a route indication, and a home network identifier of the remote terminal device. A manner of generating the first identifier is disclosed in this implementation. After the first identifier is generated, the first identifier may be sent to the remote terminal device.

In a possible implementation, the second freshness parameter is a value of a counter locally maintained by the remote authentication service function network element. When the remote AUSF network element and the remote terminal device separately locally maintain their respective counters, a same initial value and a same counting rule are used, so that the values of the two counters are consistent.

In a possible implementation, the method further includes: The remote authentication service function network element receives the relay service code. The remote authentication service function network element sends the second freshness parameter. The second freshness parameter may be sent to the remote terminal device, and is used to generate the first identifier. The second freshness parameter may be a random number generated by the remote AUSF network element or a value of a counter locally maintained by the remote AUSF network element.

In a possible implementation, the method further includes: The remote authentication service function network element receives the relay service code. The remote authentication service function network element sends the first identifier. The relay service code is from the remote terminal device, and the first identifier is sent to the remote terminal device.

In a possible implementation, the first identifier includes the route indication and the home network identifier. In this case, the PKMF network element determines a UDM network element or the remote AUSF network element based on the route indication and the home network identifier.

In a possible implementation, the method further includes: The remote authentication service function network element receives first verification information. The remote authentication service function network element generates a first temporary key based on the first shared key, and obtains third verification information based on the first temporary key and all or some information elements of a message carrying the first verification information. The remote authentication service function network element compares the first verification information with the third verification information, to verify the remote terminal device. That is, the remote authentication service function network element verifies whether the remote terminal device is authorized to access a network through the relay terminal device to obtain a service.

In a possible implementation, that the remote authentication service function network element generates a first temporary key based on the first shared key includes: The remote authentication service function network element generates the first temporary key based on the first shared key and at least one of the following: the relay service code, a third freshness parameter, the second identifier, and the first identifier of the remote terminal device. The third freshness parameter is generated by the remote terminal device. A manner of generating the first temporary key is disclosed in this implementation.

In a possible implementation, the at least one first freshness parameter includes a first random number, and the method further includes: The remote authentication service function network element receives the first random number. The first random number is from the remote terminal device.

In a possible implementation, the at least one first freshness parameter includes a second random number, and the method further includes: The remote authentication service function network element sends the second random number. The second random number is sent to the remote terminal device.

In a possible implementation, the at least one first freshness parameter is a value of a counter locally maintained by the remote authentication service function network element. When the remote AUSF network element and the remote terminal device separately locally maintain their respective counters, a same initial value and a same counting rule are used, so that the values of the two counters are consistent.

In a possible implementation, the method further includes: The remote authentication service function network element sends the first identifier to a unified data management network element. The first identifier is used by another network element (for example, the PKMF network element) to obtain an instance identifier of the remote AUSF network element and/or a SUPI of the remote terminal device from the UDM network element. The instance identifier of the remote AUSF network element is used to determine the remote AUSF network element serving the remote terminal device.

In a possible implementation, the first shared key is a key Kausf (or another key generated based on the key) negotiated between the remote terminal device and the remote authentication service function network element when the remote terminal device accesses a network.

According to a third aspect, a key obtaining method is provided. The method includes: A proximity-based services key management function network element receives a first identifier of a remote terminal device and a relay service code. The first identifier is an identifier that is of the remote terminal device and that is corresponding to the relay service code, or the first identifier is an anonymous identifier of the remote terminal device. The proximity-based services key management function network element obtains, based on the first identifier, a root key for communication between the remote terminal device and a relay terminal device. The root key is generated based on a first shared key, the relay service code, and at least one first freshness parameter, and the first shared key is a key shared between the remote terminal device and a remote authentication service function network element. The proximity-based services key management function network element sends the root key.

According to the key obtaining method provided in this embodiment of this application, the PKMF network element receives the relay service code and the first identifier of the remote terminal device. The first identifier is the identifier that is of the remote terminal device and that is corresponding to the relay service code, or the first identifier is the anonymous identifier of the remote terminal device. The PKMF network element obtains, based on the first identifier, the root key for communication between the remote terminal device and the relay terminal device. The root key is generated based on the first shared key, the relay service code, and the at least one first freshness parameter, and the first shared key is the key shared between the remote terminal device and a remote authentication service function network element. The PKMF network element sends the root key. The first identifier is used by the PKMF network element to determine a corresponding second shared key, so that the remote terminal device and the PKMF network element can generate, in a same manner, the root key for communication between the remote terminal device and the relay terminal device, to implement key sharing between the remote terminal device and the relay terminal device.

In a possible implementation, that the proximity-based services key management function network element obtains, based on the first identifier, a root key for communication between the remote terminal device and a relay terminal device includes: The proximity-based services key management function network element sends the first identifier to a unified data management function network element. The proximity-based services key management function network element receives identification information of the remote authentication service function network element from the unified data management function network element.

The proximity-based services key management function network element sends the first identifier to the corresponding remote authentication service function network element based on the identification information. The proximity-based services key management function network element receives the root key from the remote authentication service function network element. A manner of obtaining the root key by the PKMF network element is disclosed in this implementation.

In a possible implementation, that the proximity-based services key management function network element obtains, based on the first identifier, a root key for communication between the remote terminal device and a relay terminal device includes: The proximity-based services key management function network element sends the first identifier to a unified data management function network element. The proximity-based services key management function network element receives identification information of the remote authentication service function network element and a permanent identifier of the remote terminal device from the unified data management function network element. The proximity-based services key management function network element sends the permanent identifier of the remote terminal device to the corresponding remote authentication service function network element based on the identification information. The proximity-based services key management function network element receives the root key from the remote authentication service function network element. A manner of obtaining the root key by the PKMF network element is disclosed in this implementation.

In a possible implementation, that the proximity-based services key management function network element obtains, based on the first identifier, a root key for communication between the remote terminal device and a relay terminal device includes: The proximity-based services key management function network element receives at least one second shared key from the remote authentication service function network element. The second shared key is a key shared between the remote terminal device and the proximity-based services key management function network element, and the second shared key is generated based on the first shared key and the relay service code. The proximity-based services key management function network element generates, based on the second shared key corresponding to the first identifier and the at least one first freshness parameter, the root key for communication between the remote terminal device and the relay terminal device. A manner of obtaining the root key by the PKMF network element is disclosed in this implementation.

In a possible implementation, the method further includes: The proximity-based services key management function network element receives second verification information. The proximity-based services key management function network element generates fourth verification information based on the first freshness parameter and the second shared key. The proximity-based services key management function network element compares the second verification information with the fourth verification information, to verify the remote terminal device. That is, the remote authentication service function network element verifies whether the remote terminal device is authorized to access a network through the relay terminal device to obtain a service.

In a possible implementation, the at least one first freshness parameter includes a first random number, and the method further includes: The proximity-based services key management function network element receives the first random number. The first random number is from the remote terminal device.

In a possible implementation, the at least one first freshness parameter includes a second random number, and the method further includes: The proximity-based services key management function network element sends the second random number. The second random number is sent to the remote terminal device.

In a possible implementation, the at least one first freshness parameter is a value of a counter locally maintained by the proximity-based services key management function network element. When the PKMF network element and the remote terminal device separately locally maintain their respective counters, a same initial value and a same counting rule are used, so that the values of the two counters are consistent.

In a possible implementation, the first shared key is a key Kausf (or another key generated based on the key) negotiated between the remote terminal device and the remote authentication service function network element when the remote terminal device accesses a network.

According to a fourth aspect, a communication apparatus is provided. The communication apparatus includes a transceiver module and a processing module. The transceiver module is configured to send a first identifier and a relay service code to a relay terminal device. The first identifier is an identifier that is of a remote terminal device and that is corresponding to the relay service code, or the first identifier is an anonymous identifier of the remote terminal device. The processing module is configured to generate, based on a first shared key, the relay service code, and at least one first freshness parameter, a root key for communication between the remote terminal device and the relay terminal device. A remote authentication service function network element is an authentication service function network element that serves the remote terminal device, and the first shared key is a key shared between the remote terminal device and the remote authentication service function network element.

In a possible implementation, the first identifier is a SUCI of the remote terminal device.

In a possible implementation, the processing module and the transceiver module are further configured to obtain the first identifier.

In a possible implementation, the transceiver module is further configured to: send the relay service code; and receive the first identifier corresponding to the relay service code.

In a possible implementation, the processing module is further configured to: generate a temporary identifier based on the first shared key and the relay service code; and obtain the first identifier based on the temporary identifier.

In a possible implementation, the processing module is further configured to generate the temporary identifier based on the first shared key, the relay service code, and a second freshness parameter.

In a possible implementation, the processing module is further configured to generate the first identifier based on a second freshness parameter, a route indication, and a home network identifier.

In a possible implementation, the transceiver module is further configured to: send the relay service code; and receive the second freshness parameter corresponding to the relay service code.

In a possible implementation, the second freshness parameter is a value of a counter locally maintained by the remote terminal device.

In a possible implementation, the first identifier includes the route indication and the home network identifier.

In a possible implementation, the transceiver module is further configured to send first verification information to the relay terminal device. The first verification information is generated based on a first temporary key and all or some information elements of a message carrying the first verification information, and the first temporary key is generated based on the first shared key.

In a possible implementation, the first temporary key is generated based on the first shared key and at least one of the following: the relay service code, a third freshness parameter, a second identifier of the remote terminal device, and the first identifier, and the third freshness parameter is generated by the remote terminal device. A manner of generating the first temporary key is disclosed in this implementation.

In a possible implementation, the transceiver module is further configured to send second verification information to the relay terminal device. The second verification information is generated based on the first freshness parameter, the relay service code, and the first shared key.

In a possible implementation, the at least one first freshness parameter includes a first random number, and the transceiver module is further configured to send the first random number to the relay terminal device. The first random number is sent to the remote AUSF network element or a PKMF network element.

In a possible implementation, the at least one first freshness parameter includes a second random number, and the transceiver module is further configured to receive the second random number from the relay terminal device. The second random number may be from the remote AUSF network element or the PKMF network element.

In a possible implementation, the at least one first freshness parameter is a value of a counter locally maintained by the remote terminal device.

In a possible implementation, the first shared key is a key Kausf negotiated between the remote terminal device and the remote authentication service function network element when the remote terminal device accesses a network.

In a possible implementation, the processing module is further configured to: generate a second shared key based on the first shared key and the relay service code, and generate the root key based on the second shared key and the at least one first freshness parameter. The second shared key is a key shared between the remote terminal device and the proximity-based services key management function network element.

According to a fifth aspect, a communication apparatus is provided. The communication apparatus includes a transceiver module and a processing module. The processing module is configured to obtain a relay service code and one of a first identifier or a second identifier of a remote terminal device. The second identifier is a permanent identifier of the remote terminal device, and the first identifier is an identifier that is of the remote terminal device and that is corresponding to the relay service code. The processing module is further configured to obtain a first shared key corresponding to the first identifier or the second identifier. The first shared key is a key shared between the remote terminal device and a remote authentication service function network element. The remote authentication service function network element generates, based on the first shared key, the relay service code, and at least one first freshness parameter, a root key for communication between the remote terminal device and a relay terminal device. The transceiver module is configured to send the root key.

In a possible implementation, the transceiver module is further configured to receive one of the first identifier or the second identifier of the remote terminal device.

In a possible implementation, the processing module is further configured to: generate a temporary identifier based on the first shared key and the relay service code. The remote authentication service function network element generates the first identifier based on the temporary identifier.

In a possible implementation, the processing module is further configured to generate the temporary identifier based on the first shared key, the relay service code, and a second freshness parameter.

In a possible implementation, the processing module is further configured to generate the first identifier based on a second freshness parameter, a route indication, and a home network identifier of the remote terminal device.

In a possible implementation, the second freshness parameter is a value of a counter locally maintained by the remote authentication service function network element.

In a possible implementation, the transceiver module is further configured to: receive the relay service code; and send the second freshness parameter.

In a possible implementation, the transceiver module is further configured to: receive the relay service code; and send the first identifier.

In a possible implementation, the first identifier includes the route indication and the home network identifier.

In a possible implementation, the transceiver module is further configured to receive first verification information. The processing module is further configured to: generate a first temporary key based on the first shared key, and obtain third verification information based on the first temporary key and all or some information elements of a message carrying the first verification information; and compare the first verification information with the third verification information, to verify the remote terminal device.

In a possible implementation, the processing module is further configured to generate the first temporary key based on the first shared key and at least one of the following: the relay service code, a third freshness parameter, the second identifier, and the first identifier of the remote terminal device. The third freshness parameter is generated by the remote terminal device.

In a possible implementation, the at least one first freshness parameter includes a first random number, and the transceiver module is further configured to receive the first random number.

In a possible implementation, the at least one first freshness parameter includes a second random number, and the transceiver module is further configured to send the second random number.

In a possible implementation, the at least one first freshness parameter is a value of a counter locally maintained by the remote authentication service function network element.

In a possible implementation, the transceiver module is further configured to send the first identifier to a unified data management network element.

In a possible implementation, the first shared key is a key Kausf negotiated between the remote terminal device and the remote authentication service function network element when the remote terminal device accesses a network.

According to a sixth aspect, a communication apparatus is provided. The communication apparatus includes a transceiver module and a processing module. The transceiver module is configured to receive a relay service code and a first identifier of a remote terminal device. The first identifier is an identifier that is of the remote terminal device and that is corresponding to the relay service code, or the first identifier is an anonymous identifier of the remote terminal device. The processing module is configured to obtain, based on the first identifier, a root key for communication between the remote terminal device and a relay terminal device. The root key is generated based on a first shared key, the relay service code, and at least one first freshness parameter, and the first shared key is a key shared between the remote terminal device and a remote authentication service function network element. The transceiver module is further configured to send the root key.

In a possible implementation, the transceiver module is further configured to: send the first identifier to a unified data management function network element; receive identification information of the remote authentication service function network element from the unified data management function network element; send the first identifier to the corresponding remote authentication service function network element based on the identification information; and receive the root key from the remote authentication service function network element.

In a possible implementation, the transceiver module is further configured to: send the first identifier to a unified data management function network element; receive identification information of the remote authentication service function network element and a permanent identifier of the remote terminal device from the unified data management function network element; send the permanent identifier of the remote terminal device to the corresponding remote authentication service function network element based on the identification information; and receive the root key from the remote authentication service function network element.

In a possible implementation, the transceiver module is further configured to: receive at least one second shared key from the remote authentication service function network element. The second shared key is a key shared between the remote terminal device and a proximity-based services key management function network element, and the second shared key is generated based on the first shared key and the relay service code. The processing module is further configured to generate, based on the second shared key corresponding to the first identifier and the at least one first freshness parameter, the root key for communication between the remote terminal device and the relay terminal device.

In a possible implementation, the transceiver module is further configured to receive second verification information. The processing module is further configured to: generate fourth verification information based on the first freshness parameter and the second shared key; and compare the second verification information with the fourth verification information, to verify the remote terminal device.

In a possible implementation, the at least one first freshness parameter includes a first random number, and the transceiver module is further configured to receive the first random number.

In a possible implementation, the at least one first freshness parameter includes a second random number, and the transceiver module is further configured to send the second random number.

In a possible implementation, the at least one first freshness parameter is a value of a counter locally maintained by the proximity-based services key management function network element.

In a possible implementation, the first shared key is a key Kausf negotiated between the remote terminal device and the remote authentication service function network element when the remote terminal device accesses a network.

According to a seventh aspect, a communication apparatus is provided. The communication apparatus includes a processor. The processor is connected to a memory, the memory is configured to store a computer program, and the processor is configured to execute the computer program stored in the memory, to enable the communication apparatus to perform the method according to any one of the first aspect and the implementations of the first aspect.

According to an eighth aspect, a communication apparatus is provided. The communication apparatus includes a processor. The processor is connected to a memory, the memory is configured to store a computer program, and the processor is configured to execute the computer program stored in the memory, to enable the communication apparatus to perform the method according to any one of the second aspect and the implementations of the second aspect.

According to a ninth aspect, a communication apparatus is provided. The communication apparatus includes a processor. The processor is connected to a memory, the memory is configured to store a computer program, and the processor is configured to execute the computer program stored in the memory, to enable the communication apparatus to perform the method according to any one of the third aspect and the implementations of the third aspect.

According to a tenth aspect, a computer-readable storage medium is provided. The computer-readable storage medium stores a computer program. When the computer program is run on a computer, the computer is enabled to perform the method according to any one of the first aspect and the implementations of the first aspect.

According to an eleventh aspect, a computer-readable storage medium is provided. The computer-readable storage medium stores a computer program. When the computer program is run on a computer, the computer is enabled to perform the method according to any one of the second aspect and the implementations of the second aspect.

According to a twelfth aspect, a computer-readable storage medium is provided. The computer-readable storage medium stores a computer program. When the computer program is run on a computer, the computer is enabled to perform the method according to any one of the third aspect and the implementations of the third aspect.

According to a thirteenth aspect, a computer program product including instructions is provided. When the instructions are run on a computer or a processor, the computer or the processor is enabled to perform the method according to any one of the first aspect and the implementations of the first aspect.

According to a fourteenth aspect, a computer program product including instructions is provided. When the instructions are run on a computer or a processor, the computer or the processor is enabled to perform the method according to any one of the second aspect and the implementations of the second aspect.

According to a fifteenth aspect, a computer program product including instructions is provided. When the instructions are run on a computer or a processor, the computer or the processor is enabled to perform the method according to any one of the third aspect and the implementations of the third aspect.

According to a sixteenth aspect, a communication system is provided. The communication system includes the communication apparatus according to any one of the fourth aspect and the implementations of the fourth aspect, the communication apparatus according to any one of the fifth aspect and the implementations of the fifth aspect, and the communication apparatus according to any one of the sixth aspect and the implementations of the sixth aspect; or includes the communication apparatus according to any one of the seventh aspect and the implementations of the seventh aspect, the communication apparatus according to any one of the eighth aspect and the implementations of the eighth aspect, and the communication apparatus according to any one of the ninth aspect and the implementations of the ninth aspect.

For technical effects of the fourth aspect to the sixteenth aspect, refer to the content of the first aspect to the third aspect. Details are not described herein again.

DESCRIPTION OF EMBODIMENTS

A network architecture and a service scenario described in embodiments of this application are intended to describe the technical solutions in embodiments of this application more clearly, and do not constitute a limitation on the technical solutions provided in embodiments of this application. A person of ordinary skill in the art may know that: With evolution of the network architecture and emergence of new service scenarios, the technical solutions provided in embodiments of this application are also applicable to similar technical problems.

In embodiments of this application, "/" represents an "or" relationship between one item following the character and one item preceding the character.

Embodiments of this application may be applied to a time division duplexing (TDD) scenario, and may also be applied to a frequency division duplexing (FDD) scenario. This is not limited.

Embodiments of this application are illustrated based on a 5G network scenario in a wireless communication network. It is to be noted that the solutions in embodiments of this application may be further applied to another wireless communication network, and a corresponding name may be replaced with a corresponding function name in the another wireless communication network.

Figure 1:
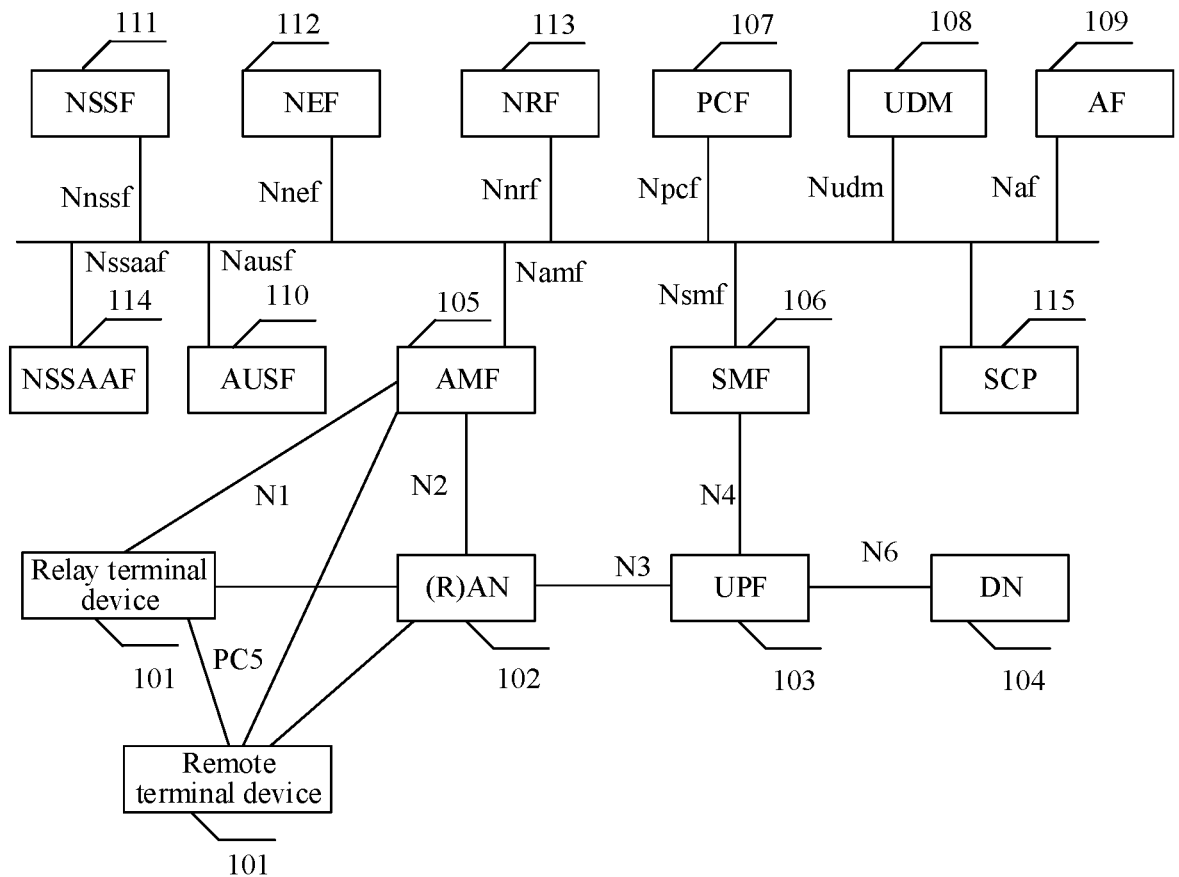
FIG. 1 is a schematic diagram of an architecture of a communication system according to an embodiment of this application.

FIG. 1 provides an architecture of a 5G communication system, including an access network and a core network. The access network is configured to implement a function related to radio access, and the access network includes a 3GPP access network and a non-3GPP access network. The communication system includes terminal devices 101, a (radio) access network ((radio) access network, (R)AN) network element 102, a user plane function (UPF) network element 103, a data network (DN) 104, an access and mobility management function (AMF) network element 105, a session management function (SMF) network element 106, a policy control function (PCF) network element 107, a unified data management (UDM) network element 108, an application function (AF) network element 109, an authentication server function (AUSF) network element 110, a network slice selection function (NSSF) network element 111, a network exposure function (NEF) network element 112, a network repository function (NRF) network element 113, a network slice-specific authentication and authorization function (NSSAAF) 114, and a service communication proxy (SCP) 115.

It is to be noted that names of interfaces between the network elements in FIG. 1 are merely examples, and during specific implementation, the interface names may be other names. This is not limited. For example, an interface between the terminal device 101 and the AMF network element 105 may be an N1 interface, an interface between the (R)AN network element 102 and the AMF network element 105 may be an N2 interface, an interface between the (R)AN network element 102 and the UPF network element 103 may be an N3 interface, an interface between the UPF network element 103 and the SMF network element 106 may be an N4 interface, and an interface between the UPF network element 103 and the DN 104 may be an N6 interface. The AMF network element 105 provides a service interface Namf for a network, the SMF network element 106 provides a service interface Nsmf for the network, the PCF network element 107 provides a service interface Npcf for the network, the UDM network element 108 provides a service interface Nudm for the network, the AF network element provides a service interface Naf for the network, the AUSF network element 110 provides a service interface Nausf for the network, the NSSF network element 111 provides a service interface Nnssf for the network, the NEF network element 112 provides a service interface Nnef for the network, the NRF network element 113 provides a service interface Nnrf for the network, and the NSSAAF network element 114 provides a service interface Nnssaaf for the network.

The terminal device 101 and the (R)AN network element 102 communicate with each other by using an air interface technology. The terminal device 101 may include various handheld devices, vehicle-mounted devices, wearable devices, or computing devices that have a wireless communication function, or other processing devices connected to a wireless modem; and may further include a subscriber unit, a cellular phone, a smartphone, a wireless data card, a personal digital assistant (PDA) computer, a tablet computer, a wireless modem (modem), a handheld device (handheld), a laptop computer, a cordless phone or a wireless local loop (WLL) station, a machine type communication (MTC) terminal, a user equipment (UE), a mobile station (MS), a terminal device (terminal), relay user equipment, or the like. The relay user equipment may be a 5G residential gateway (RG). For ease of description, the devices mentioned above are collectively referred to as the terminal device.

In embodiments of this application, a remote terminal device (remote UE) may access a 3GPP network through a relay terminal device (relay UE), and indirectly communicate with a network device and an application server.

The (R)AN network element 102 is a device that provides radio access for the terminal device 101, and includes a RAN network element and an AN network element. The RAN network element is mainly a wireless network device in 3GPP, and the AN network element may be an access network device defined in non-3GPP. In this application, the RAN network element is used as an example, but this application is not intended to be limited thereto.

The RAN network element is mainly responsible for functions on an air interface side, such as radio resource management, quality of service (QOS) management, and data compression and encryption. The RAN network element may include various base stations such as a macro base station, a micro base station (also referred to as a small cell), a relay station, and an access point. In systems that use different radio access technologies, a device has a base station function may have different names. For example, in a 5th generation (5G) communication system, the device is referred to as a RAN network element or a gNB (5G NodeB); in a long term evolution (LTE) system, the device is referred to as an evolved NodeB (eNB or eNodeB); and in a 3rd generation (3G) communication system, the device is referred to as a NodeB.

The AN network element allows a terminal device and a 3GPP core network to perform interconnection and interworking by using a non-3GPP technology. For example, the non-3GPP technology includes wireless fidelity (Wi-Fi), worldwide interoperability for microwave access (WiMAX), and a code division multiple access (CDMA) network, and the like.

The UPF network element 103 is mainly responsible for processing a user packet, such as forwarding and charging for the user packet. User data may be received from the data network, and transmitted to the terminal device through the RAN network element. The UPF network element may further receive user data from the terminal device through the RAN network element, and forward the user data to the DN. Transmission resources and scheduling functions in the UPF network element that provide services for the terminal device are managed and controlled by the SMF network element.

The DN 104 refers to a network that provides a data transmission service for a user, for example, an Internet Protocol (IP) multimedia service (IP multimedia service, IMS) or an internet. The terminal device 101 accesses the DN 104 by establishing a protocol data unit (PDU) session among the terminal device, the RAN network element 102, the UPF network element 103, and the DN 104. A path on the user plane is from the terminal device to the (R)AN network element, then to the UPF network element, and to the DN.

The AMF network element 105 is mainly responsible for mobility management in a mobile network, for example, user position update, registration of a user with a network, and user switching.

The SMF network element 106 is mainly responsible for session management in a mobile network, for example, session establishment, modification, and release. For example, specific functions include: allocation of an IP address for a user and selection of a UPF network element that provides a packet forwarding function.

The PCF network element 107 provides a unified policy framework to control network behavior, and provides a policy rule, for example, a QoS policy or a slice selection policy, for a control layer network function. The PCF network element 107 is also responsible for obtaining subscription information related to policy decision-making.

The UDM network element 108 is configured to: generate an authentication credential, process a subscriber identifier (for example, store and manage a permanent identifier of a subscriber), control access authorization, manage subscription data, and the like.

The AF network element 109 may also be referred to as a server, and is responsible for interacting with a 3GPP core network to provide a service, for example, affecting a data routing decision, a policy control function, or providing some third-party services for a network side.

The AUSF network element 110 is configured to authenticate and authorize a user.

The NSSF network element 111 is configured to perform centralized management on a slice function.

The NEF network element 112 is responsible for isolating internal and external networks, and is configured to support exposure of a capability and an event, including an exposure monitoring (Monitoring) capability, a policy/charging capability, an analysis reporting capability, and the like.

The NRF network element 113 is responsible for maintaining a text of an available network function instance and a service supported by the network function, and is used by another network function network element to perform service discovery or network function network element discovery.

The NSSAAF network element 114 is configured to support a network slice-specific authentication and authorization procedure, and may communicate with an AAA (authentication, authorization, and accounting) server or an AAA proxy.

The SCP network element 115 is configured to: support indirect communication and proxy discovery, send a routing message to a target network function network element or a next-hop SCP, and the like.

In a subject research of proximity-based services (ProSe), to support proximity-based services communication, a 5G direct discovery name management function (DDNMF) network element is further introduced, and is configured to allocate and process a ProSe application identifier and ProSe application code mapping.

Figure 2:
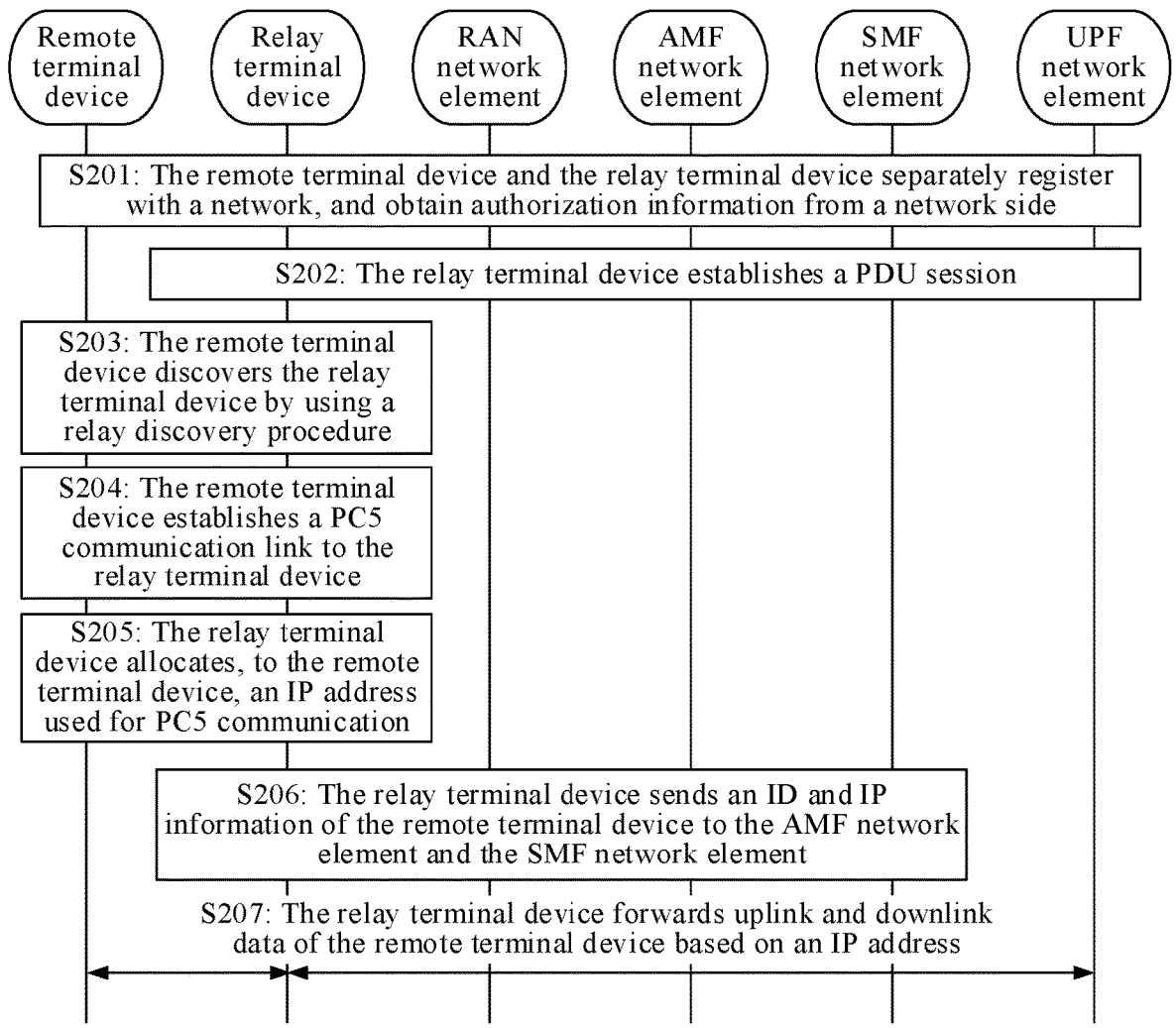
FIG. 2 is a schematic flowchart 1 of a key obtaining method according to an embodiment of this application.

As shown in FIG. 2, in indirect communication in a 5G communication system, a layer 3-based (where for a PDU session of IP type, a relay terminal device forwards data based on an IP address) indirect communication connection establishment procedure includes the following steps.

S201: A remote terminal device and the relay terminal device separately register with a network, and obtain authorization information from a network side.

The authorization information obtained by the remote terminal device includes:
  indication information, indicating whether the remote terminal device is authorized to access a 5GC through the relay terminal device;
  parameters used for proximity-based services relay discovery (ProSe Relay Discovery), where the parameters are used to enable establishment of a connection to the relay terminal device, and include, for example, a relay service code and a PDU session parameter (for example, a data network name (DNN), single network slice selection assistance information (S-NSSAI), access type preference, a PDU session type, or a service and session continuity mode); and
  security-related content that is based on the relay service code and that is used for proximity-based services relay discovery (ProSe Relay Discovery).

The authorization information obtained by the relay terminal device includes:
  an authorization policy for acting as the relay terminal device, including a public land mobile network (PLMN) that is authorized to provide a relay service for the remote terminal device;
  parameters used for proximity-based services relay discovery (ProSe Relay Discovery), including indication information, indicating that the relay terminal device is authorized to act as a relay (UE-to-Network relay) between UE and a network; the relay service code, and the PDU session parameter (for example, the DNN, the S-NSSAI, the access type preference, the PDU session type, or the service and session continuity mode); and
  security-related content that is based on the relay service code and that is used for proximity-based services relay discovery (ProSe Relay Discovery).

S202: The relay terminal device establishes a PDU session.

The session may be a PDU session dedicated to serving the remote terminal device. For the PDU session of IP type, a network-side SMF network element allocates an IP address (which may be an IPV4 address, an IPV6 prefix, or the like) to the PDU session. The relay terminal device transmits data to the remote terminal device by using the PDU session. This step is optional.

S203: The remote terminal device discovers the relay terminal device by using a relay discovery procedure.

S204: The remote terminal device establishes a PC5 communication link to the relay terminal device.

If the PDU session established by the relay terminal device cannot meet a session requirement (for example, a DNN or S-NSSAI) of the remote terminal device, the relay terminal device establishes a new PDU session for the remote terminal device. The PDU session is used for transmission of data between the remote terminal device and an application server. Alternatively, if the relay terminal device does not establish a PDU session used for transmission of a service of the remote terminal device, the new PDU session is established. The PDU session is used for transmission of the data between the remote terminal device and the application server.

S205: The relay terminal device allocates, to the remote terminal device, an IP address used for PC5 communication.

S206: The relay terminal device sends an ID and IP information (IP info) of the remote terminal device to an AMF network element and the SMF network element.

The IP information is an address that is allocated by the relay terminal device to the remote terminal device and that is used for network side communication.

This step may be performed by using a PDU session modification procedure. For example, if the IP address allocated by the SMF network element to the relay terminal device is an IPV4 address, the IP information is represented as a specific port number (TCP/UDP port). This means that the relay terminal device transmits data of the remote terminal device based on the IPV4 address and the specific port number. If the IP address allocated by the SMF network element to the relay terminal device is the IPV6 prefix (IPv6 prefix), the IP information is represented as a longer IPv6 prefix. This means that the relay terminal device uses the longer IPv6 prefix to transmit data of the remote terminal device.

S207: The relay terminal device forwards uplink and downlink data of the remote terminal device based on the IP address.

For example, an IP address used by the remote terminal device on the PC5 communication link is IP3, an IP address corresponding to the PDU session of the relay terminal device is IP1, and the IP information (IP info) allocated by the relay terminal device to the remote terminal device is IP1-1. In this case, the remote terminal device transmits data to the server based on IP3, and the server transmits data to the remote terminal device based on IP1-1. The relay terminal device needs to bind an association relationship between IP3 and IP1-1.

In a downlink direction, the relay terminal device receives an IP1-1 data packet from a UPF network element, learns that the data is from the remote terminal, modifies an IP address to IP3, and sends the IP1-1 data packet to the remote terminal device through the PC5 link.

In an uplink direction, after receiving an IP3 data packet, the relay terminal device modifies an IP address to IP1-1, sends the IP address to the UPF network element by using the PDU session, and sends the IP3 data packet to the server.

In the foregoing indirect communication connection establishment process, to ensure communication security, a security connection needs to be established between the remote terminal device and the relay terminal device. To be specific, encryption protection and/or integrity protection are/is performed on data transmitted between the remote terminal device and the relay terminal device. Because the indirect communication connection is dynamically established on demand, shared security information (for example, a key) cannot be preconfigured between the remote terminal device and the relay terminal device. Consequently, the security connection between the remote terminal device and the relay terminal device cannot be established based on the preconfigured shared security information. Therefore, the shared security information (for example, the key) between the remote terminal device and the relay terminal device needs to be dynamically established.

Figure 3A:
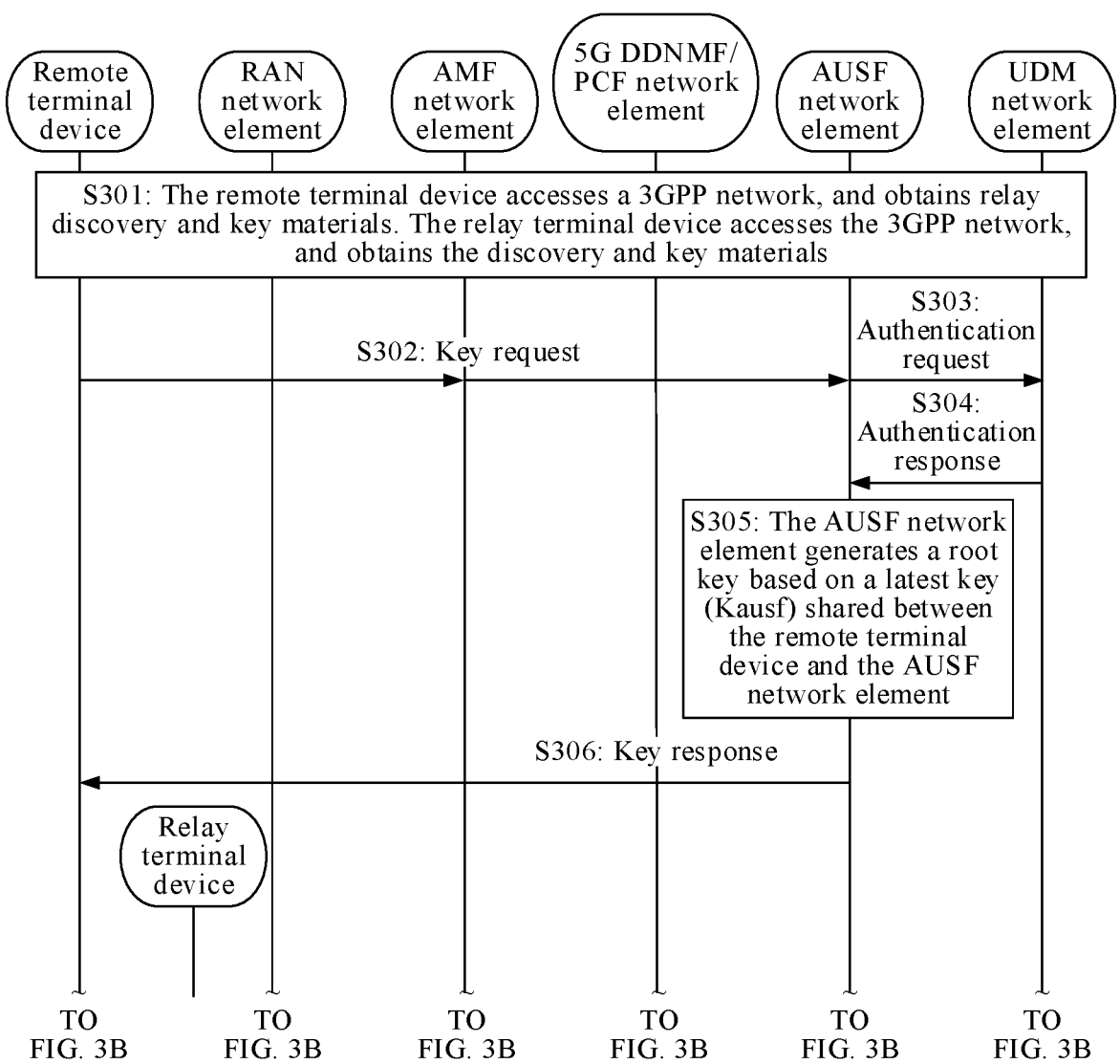
FIG. 3A and FIG. 3B is a schematic flowchart 2 of a key obtaining method according to an embodiment of this application.
Figure 3B:
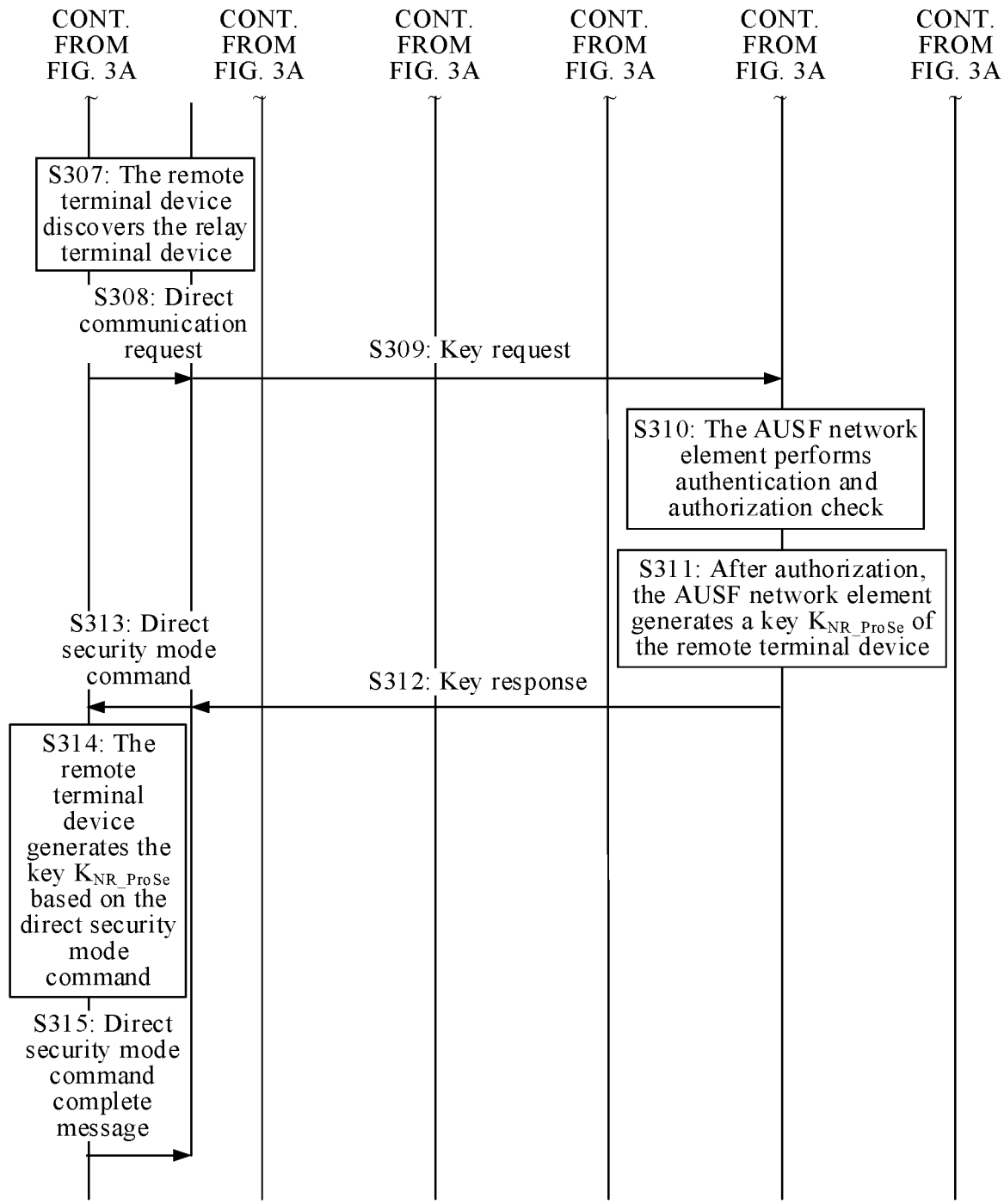

An embodiment of this application provides a key obtaining method. As shown in FIG. 3A and FIG. 3B, the following steps are included.

S301: A remote terminal device accesses a 3GPP network, and obtains relay discovery and key materials. A relay terminal device accesses the 3GPP network, and obtains the discovery and key materials.

S302: The remote terminal device sends a key request to an AUSF network element through an AMF network element.

The key request includes a proximity-based services remote access indication, a 5G globally unique temporary identity (GUTI), or a subscription concealed identifier (SUCI).

S303: The AUSF network element sends an authentication request to a UDM network element.

The authentication request includes the proximity-based services remote access indication, the 5G-GUTI, or the SUCI.

S304: The UDM network element sends an authentication response to the AUSF network element.

The authentication response includes a subscription permanent identifier (SUPI) of a user.

S305: The AUSF network element generates a root key (REAR Key) based on a latest key (Kausf) shared between the remote terminal device and the AUSF network element.

S306: The AUSF network element sends a key response to the remote terminal device.

The key response includes the root key and an identifier of the relay terminal device.

S307: The remote terminal device discovers the relay terminal device.

S308: The remote terminal device sends a direct communication request to the relay terminal device.

The direct communication request includes a relay service code, the 5G-GUTI, and a message authentication code (MAC).

S309: The relay terminal device sends a key request to the AUSF network element.

The key request includes the relay service code, the 5G-GUTI, and the MAC.

S310: The AUSF network element performs authentication and authorization check.

S311: After authorization, the AUSF network element generates a key $K_{NR\_ProSe}$ of the remote terminal device.

$K_{NR\_ProSe}$=KDF (root key REAR key, 5G-GUTI, relay service code or service identifier, freshness parameter, and another possible parameter). A key derivation function (KDF) is an algorithm for generating a key.

S312: The AUSF network element sends a key response to the relay terminal device.

The key response includes $K_{NR\_ProSe}$ and the freshness parameter.

S313: The relay terminal device sends a direct security mode command to the remote terminal device.

The direct security mode command includes the freshness parameter for generating $K_{NR\_ProSe}$.

S314: The remote terminal device generates the key $K_{NR\_ProSe}$ based on the direct security mode command.

S315: The remote terminal device sends a direct security mode command complete message to the relay terminal device based on the direct security mode command.

In this solution, the identifier of the relay terminal device is used in a key derivation process. However, there are one or more terminal devices that can provide a relay service, and before the remote terminal device discovers the relay terminal device, the network cannot obtain an identifier of a terminal device that provides a relay service. Therefore, a corresponding key cannot be derived. In addition, how to determine the AUSF network element that derives the key is not defined, and how the relay terminal device discovers the AUSF network element that derives the key for the remote terminal device is not defined either. If the relay terminal device randomly selects an AUSF network element, and if the AUSF network element does not store a key obtained by the remote terminal device, a MAC generated by the remote terminal device cannot be verified.

Figure 4:
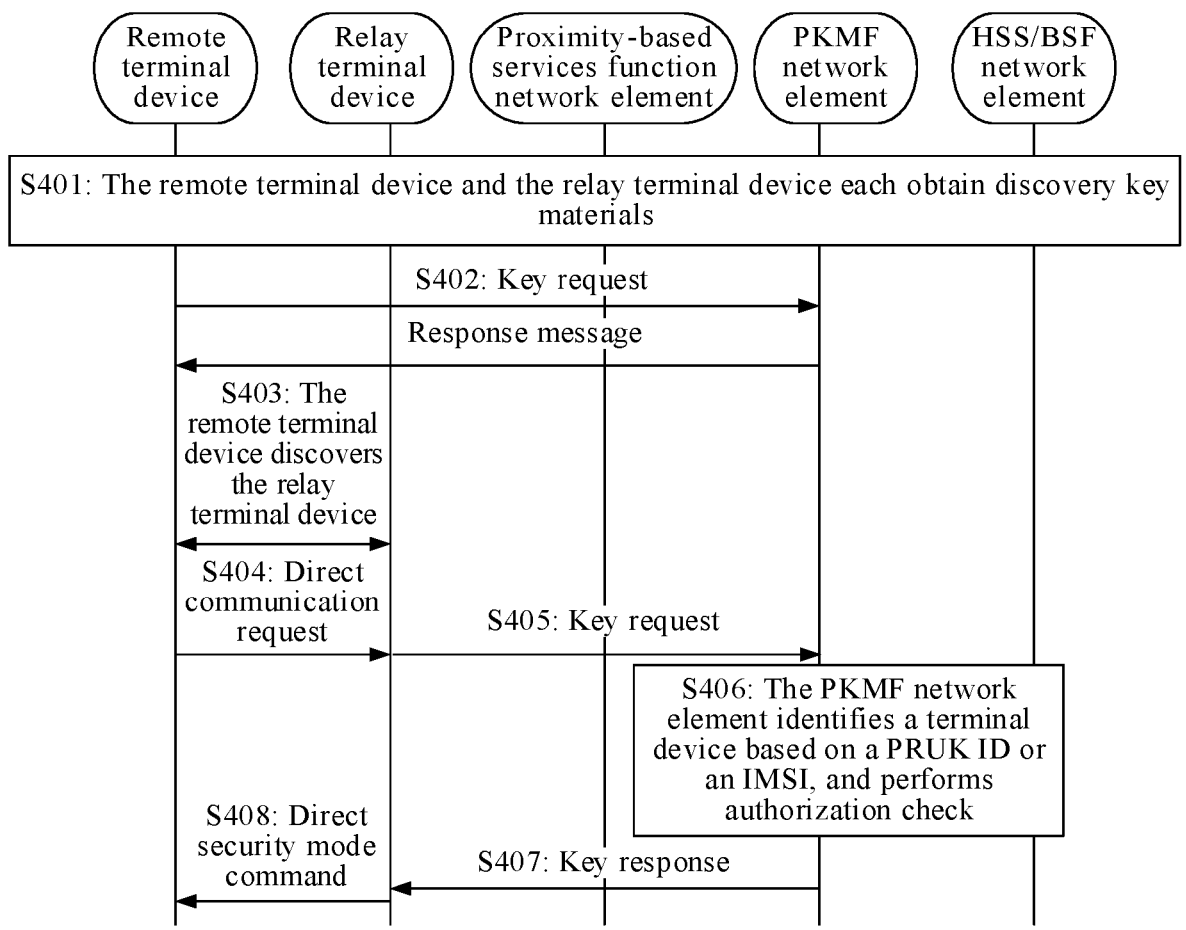
FIG. 4 is a schematic flowchart 3 of a key obtaining method according to an embodiment of this application.

An embodiment of this application provides a key obtaining method. As shown in FIG. 4, the following steps are included.

S401: A remote terminal device and a relay terminal device each obtain discovery key materials.

Specifically, this step includes:

The remote terminal device interacts with a proximity-based services (ProSe) function network element to obtain a relay discovery parameter and an address of a proximity-based services key management function (ProSe key management function, PKMF) network element.

The remote terminal device obtains the discovery key materials from relay PKMF network element.

The relay terminal device interacts with the proximity-based services (ProSe) function network element to obtain the relay discovery parameter and the address of the PKMF network element.

The relay terminal device obtains the discovery key materials from the PKMF network element.

S402: The remote terminal device sends a key request to the PKMF network element.

The key request includes indication information, used to request a relay communication key. Optionally, the key request includes a key identifier of a previously obtained key: a proximity-based services relay user key (ProSe relay user key, PRUK) ID.

Correspondingly, the PKMF network element sends a response message to the remote terminal device. The response message includes a PRUK and a corresponding PRUK ID.

S403: The remote terminal device discovers the relay terminal device.

S404: The remote terminal device sends a direct communication request to the relay terminal device.

The direct communication request includes a relay service code or one of the PRUK ID or an international mobile subscriber identity (IMSI).

S405: The relay terminal device sends a key request to the PKMF network element.

The key request includes the relay service code, a first random number, and one of the PRUK ID or the IMSI.

S406: The PKMF network element identifies a terminal device based on the PRUK ID or the IMSI, and performs authorization check.

After the authorization check is passed, the PKMF network element determines whether the remote terminal device needs a new PRUK. If the remote terminal device needs a new PRUK, the PKMF network element interacts with a home subscriber server (HSS) network element to obtain generic bootstrapping information (GPI) (generic bootstrapping architecture (GBA) push information (Push Info) and GBA push information) of a user or an authentication vector.

S407: The PKMF network element sends a key response to the relay terminal device.

The key response includes a key Kd, a random number for generating the key Kd, the GPI, and an identifier of the remote terminal device.

S408: The relay terminal device sends a direct security mode command to the remote terminal device.

The direct security mode command includes the GPI and the random number for generating the key Kd.

Correspondingly, the remote terminal device sends direct security mode completion to the relay terminal device.

This solution is based on a 4G communication system. Key derivation is based on a GBA mechanism. Currently, 5G does not support the GBA mechanism. When communicating with the relay terminal device, the remote terminal device may use a permanent identifier (namely, the IMSI) of the user. This may cause disclosure of user privacy.

Therefore, embodiments of this application provide another key obtaining method. A key shared between a remote terminal device and a 3GPP network is used, so that the remote terminal device and the relay terminal device establish a root key for communication. In addition, the root key is obtained based on a temporary identifier or an anonymous identifier SUCI of the remote terminal device, so that when user privacy is ensured, the relay terminal device can obtain the root key used to establish PC5 interface security.

In embodiments of this application, a remote AUSF network element is an AUSF network element that serves the remote terminal device, and a remote AUSF network element stores a key shared with the remote terminal device. A relay AUSF network element is an AUSF network element that serves the relay terminal device. A remote AMF network element is an AMF network element that serves the remote terminal device, and a relay AMF network element is an AMF network element that serves the relay terminal device. A remote PCF network element is a PCF network element that serves the remote terminal device, and a relay PCF network element is a PCF network element that serves the relay terminal device. A remote NRF network element is an NRF network element that serves the remote terminal device. A remote UDM network element is an UDM network element that serves the remote terminal device.

In embodiments of this application, unless otherwise specified, generating an identifier, a key, or verification information based on a parameter A means that the parameter A is input to an algorithm (for example, a key derivation function (KDF)) to obtain the identifier, the key, or the verification information through calculation.

A PKMF network element is a new function module, and may be deployed independently or co-deployed with another function network element. The PKMF network element is configured to manage security information of proximity-based services, for example, obtain a key shared between the remote terminal device and the relay terminal device, and perform authorization check.

Figure 5:
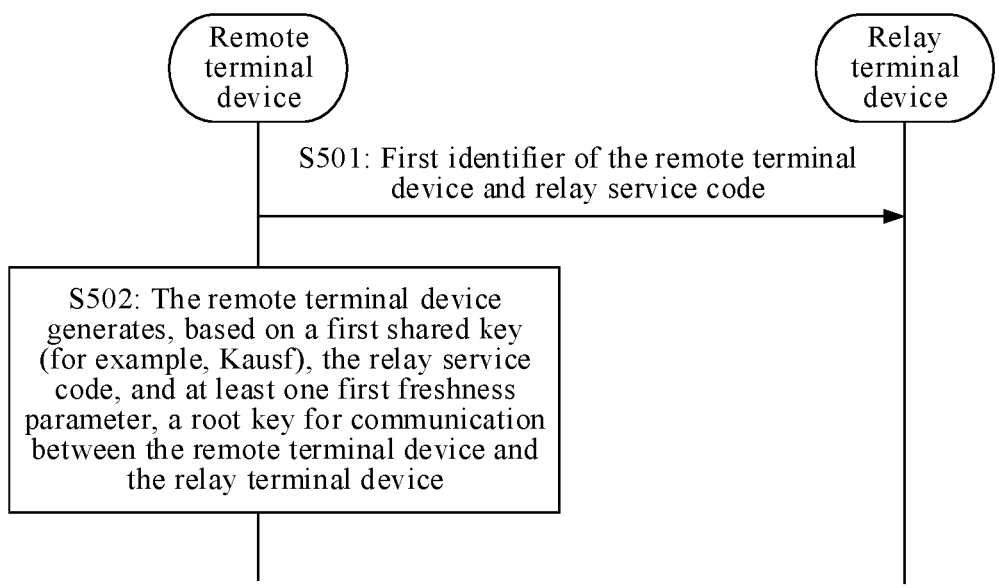
FIG. 5 is a schematic flowchart 4 of a key obtaining method according to an embodiment of this application.

As shown in FIG. 5, on a terminal side, the key obtaining method includes the following steps.

S501: A remote terminal device sends a first identifier of the remote terminal device and a relay service code to a relay terminal device.

Optionally, the remote terminal device sends first verification information to the relay terminal device.

Optionally, the remote terminal device sends second verification information to the relay terminal device.

The foregoing information may be carried in a same message (for example, a direct communication request) or different messages, and the relay terminal device finally forwards the information to a remote AUSF network element, a relay AUSF network element, or a PKMF network element.

The following describes several pieces of related information:

Relay Service Code

The relay service code is used to identify a connection service. The connection service is a service providing a connection to an application for a relay. One terminal device may be configured with different relay service codes to access different applications or services.

First Identifier

The first identifier may be an identifier (for example, a P-KID) (for example, a format may be Username/d realm) that is of the remote terminal device and that is corresponding to the relay service code, or the first identifier may be an anonymous identifier (for example, SUCI) of the remote terminal device. Therefore, a permanent identifier (for example, a SUPI) of the remote terminal device is not exposed during transmission over the air interface. The first identifier may be in a one-to-one correspondence with the relay service code. To be specific, for different relay service codes, the remote terminal device may use different first identifiers to perform communication.

Because the AUSF network element or the PKMF network element may serve a plurality of terminal devices, the first identifier of the remote terminal device is used by the AUSF network element or the PKMF network element to determine a corresponding remote terminal device, so as to determine a corresponding first shared key or determine another identifier (for example, the SUPI) of the remote terminal device. The first shared key is a key shared between the remote terminal device and the remote AUSF network element (or another key generated based on the key). The first shared key may be Kausf, and the key Kausf is shared between the remote terminal device and the remote AUSF network element through negotiation in advance when the remote terminal device accesses a network. Alternatively, the first shared key may be a key that is further derived based on Kausf and that is used for proximity-based services communication.

If the first identifier is the identifier that is of the remote terminal device and that is corresponding to the relay service code, the remote terminal device may obtain the first identifier in the following manners:

Manner 1: The remote terminal device may send at least one relay service code to the remote authentication service function network element through a remote AMF network element. The remote AUSF network element generates the first identifier corresponding to the relay service code, and sends the first identifier to the remote terminal device through the remote AMF network element. Correspondingly, the remote terminal device receives, from the remote authentication service function network element, the first identifier corresponding to the relay service code.

Manner 2: The remote terminal device generates a temporary identifier based on the first shared key (for example, Kausf) and the relay service code, and obtains the first identifier based on the temporary identifier.

A manner in which the remote terminal device generates the temporary identifier based on the first shared key (for example, Kausf) and the relay service code includes:

In a possible implementation, the first shared key (for example, Kausf) and the relay service code are input to an algorithm (for example, key derivation function (KDF)), and the temporary identifier is obtained through calculation.

Optionally, the remote terminal device may alternatively generate the temporary identifier based on the first shared key (for example, Kausf), the relay service code, and at least one of a second freshness parameter or the SUPI of the remote terminal device. That is, an input parameter for calculating the temporary identifier may further include the second freshness parameter or another parameter (for example, the SUPI of the remote terminal device).

Alternatively, in another possible implementation, the remote terminal device generates a proximity-based services root key based on the first shared key, and generates the temporary identifier based on the proximity-based services root key and the relay service code.

For example, the remote terminal device first derives the proximity-based services root key based on the first shared key (for example, Kausf). Optionally, an input parameter of the algorithm for generating the proximity-based services root key may include a character string "ProSe", the SUPI of the remote terminal device, and the like. Then, the remote terminal device generates the temporary identifier based on the proximity-based services root key and the relay service code as inputs of the KDF.

Optionally, the remote terminal device may alternatively generate the temporary identifier based on the proximity-based services root key, the relay service code, and at least one of the second freshness parameter or the SUPI of the remote terminal device. That is, an input parameter for calculating the temporary identifier may further include the second freshness parameter or another parameter (for example, the SUPI of the remote terminal device). To be specific, a manner in which the remote terminal device obtains the first identifier based on the temporary identifier includes:

In a possible implementation, the remote terminal device generates the first identifier based on the temporary identifier, a route indication, and a home network identifier of the remote terminal device. The first identifier may include the route indication and the home network identifier. For example, the temporary identifier, the route indication, and the home network identifier of the remote terminal device may be combined to obtain a character string as the temporary identifier. For example, a format of the first identifier is Username a realm. Username in the first identifier Username a realm may include the temporary identifier and the route indication, and realm may include the home network identifier of the remote terminal device.

Alternatively, in another possible implementation, the remote terminal device uses the temporary identifier as the first identifier.

Manner 3: The remote terminal device generates the first identifier based on a second freshness parameter, a route indication, and a home network identifier of the remote terminal device. The first identifier may include the route indication and the home network identifier. For example, the second freshness parameter, the route indication, and the home network identifier of the remote terminal device may be combined to obtain a character string as the temporary identifier. For example, a format of the first identifier is Username a realm. Username in the first identifier Username a realm may include the second freshness parameter and the route indication, and realm may include the home network identifier of the remote terminal device.

Manner 4: The remote terminal device generates a second shared key based on the first shared key (for example, Kausf) and the relay service code. The second shared key is a key Kp shared between the remote terminal device and the PKMF network element. The remote terminal device then generates the first identifier based on the second shared key Kp and a second freshness parameter.

In a process of generating the first identifier, the relay service code is used to generate a key based on a relay service code granularity, to ensure that different relay service codes (services) are corresponding to different temporary identifiers, so that an attacker is prevented from associating, over an air interface and based on a same first identifier, two different ongoing services of one terminal device.

In a process of generating the first identifier, the second freshness parameter is used to ensure that, for a same relay service code at different moments, a network may generate different temporary identifiers when no new key (for example, Kausf) is generated during new primary authentication, so that an attacker is prevented from associating, over an air interface and based on a same first identifier, one ongoing service performed by one terminal device at different moments.

Second Freshness Parameter

The second freshness parameter may include a value of a counter that is locally maintained by the remote terminal device and a value of a counter that is locally maintained by the remote AUSF network element. When maintaining their respective counters locally, the remote terminal device and the remote AUSF network element use a same initial value and a same counting rule, so that the values of the two counters are consistent. In this case, the remote AUSF network element does not need to send the second freshness parameter to the remote terminal device.

Alternatively, the remote terminal device may send the relay service code to the remote AUSF network element. For the relay service code, the remote AUSF network element generates the first identifier based on the second freshness parameter, and sends the second freshness parameter to the remote terminal device. Correspondingly, the remote terminal device receives, from the remote AUSF network element, the second freshness parameter corresponding to the relay service code. The second freshness parameter may include a random value generated by the remote AUSF network element or the value of the counter locally maintained by the remote AUSF network element. A specific generation manner is not limited.

First Verification Information

The first verification information is generated based on a first temporary key and all or some information elements of a message (for example, the direct communication request) that carries the first verification information. The first temporary key is generated based on the first shared key (for example, Kausf). Specifically, the first temporary key may be directly derived based on Kausf, or an intermediate key may be derived based on Kausf, and the first temporary key may be further derived based on the intermediate key.

Optionally, the first temporary key is obtained through calculation based on the first shared key (for example, Kausf) and at least one of the following: the relay service code, a third freshness parameter, a second identifier (for example, the SUPI) of the remote terminal device, and the first identifier. The third freshness parameter is generated by the remote terminal device, and may be, for example, a third random number. For example, a first temporary key Kt is obtained through calculation by using an algorithm by inputting the first shared key (for example. Kausf) and at least one of the following: the relay service code, the third freshness parameter, the second identifier of the remote terminal device, and the first identifier of the remote terminal device.

The first verification information is sent to the remote AUSF network element. After receiving the first verification information, the remote AUSF network element generates third verification information in a same manner as that of the remote terminal device. The remote AUSF network element compares the first verification information with the third verification information to verify the remote terminal device, to verify whether the remote terminal device is authorized to access a network through the relay terminal device to obtain a service.

Second Verification Information

The second verification information is generated based on a first freshness parameter, the relay service code, and the first shared key (e.g., Kausf). For example, the remote terminal device generates a second shared key Kp based on the relay service code and the first shared key (for example, Kausf), and generates the second verification information based on the first freshness parameter and the second shared key Kp.

Optionally, the remote terminal device generates the second shared key Kp based on the relay service code, the first shared key (for example, Kausf), and at least one of the second identifier (for example, the SUPI) of the remote terminal device or a proximity-based services (ProSe) character. Alternatively, the remote terminal device generates the second shared key Kp based on the first shared key (for example. Kausf) and another parameter, and generates the second verification information based on the first freshness parameter, the relay service code, and the second shared key Kp.

The second verification information is sent to the PKMF network element. After receiving the second verification information, the PKMF network element generates fourth verification information in a same manner as that of the remote terminal device. The PKMF network element compares the second verification information with the fourth verification information to verify the remote terminal device, to verify whether the remote terminal device is authorized to access a network through the relay terminal device to obtain a service.

S502: The remote terminal device generates, based on the first shared key (for example. Kausf), the relay service code, and at least one first freshness parameter, a root key for communication between the remote terminal device and the relay terminal device.

For example, the root key for communication between the remote terminal device and the relay terminal device is output based on the first shared key (for example, Kausf), the relay service code, and the at least one first freshness parameter as inputs of the key derivation function KDF.

Alternatively, an intermediate key is output by using the first shared key (for example, Kausf) as an input of the KDF. Further, the root key for communication between the remote terminal device and the relay terminal device is output by using the intermediate key, the relay service code, the at least one first freshness parameter, and the like as inputs of the KDF.

The remote terminal device may alternatively generate the second shared key Kp based on the first shared key (for example. Kausf) and the relay service code, and generate, based on the second shared key Kp and the at least one first freshness parameter, the root key for communication between the remote terminal device and the relay terminal device.

The remote terminal device may alternatively generate the second shared key Kp based on the first shared key (for example, Kausf), and generate, based on the relay service code, the second shared key Kp and the at least one first freshness parameter, the root key for communication between the remote terminal device and the relay terminal device.

First Freshness Parameter

Optionally, the at least one first freshness parameter may include a value of a counter that is locally maintained by one of the remote AUSF network element or the PKMF network element and a value of a counter that is locally maintained by the terminal device. When locally maintaining the respective counters, one of the remote AUSF network element or the PKMF network element and the terminal device use a same initial value and a counting rule, so that the values of the two counters are consistent. Optionally, one of the remote AUSF network element or the PKMF network element and the terminal device separately maintain a counter for each relay server code.

Optionally, the at least one first freshness parameter includes a first random number. Optionally, the remote terminal device may further send the first random number to the relay terminal device. The first random number is finally sent to the remote AUSF network element or the PKMF network element. Correspondingly, the remote AUSF network element or the PKMF network element receives the first random number.

Optionally, the at least one first freshness parameter includes a second random number. Optionally, the remote terminal device may further receive the second random number from the relay terminal device. The second random number may be from the remote AUSF network element or the PKMF network element. In other words, the remote AUSF network element or the PKMF network element may send the second random number.

According to the key obtaining method provided in this embodiment of this application, the remote terminal device sends the first identifier and the relay service code to the relay terminal device. The first identifier is the identifier that is of the remote terminal device and that is corresponding to the relay service code, or the first identifier is the anonymous identifier of the remote terminal device. The remote terminal device generates, based on the first shared key, the relay service code, and the at least one first freshness parameter, the root key for communication between the remote terminal device and the relay terminal device. The first identifier is used by the remote AUSF network element to determine a corresponding first shared key, or is used by a PKMF network element to determine a corresponding second shared key. The second shared key is also generated based on the first shared key and/or the relay service code. In this case, the remote terminal device and the remote AUSF network element or the PKMF network element can generate, in a same manner, the root key for communication between the remote terminal device and the relay terminal device, to share the key between the remote terminal device and the relay terminal device.

Figure 6:
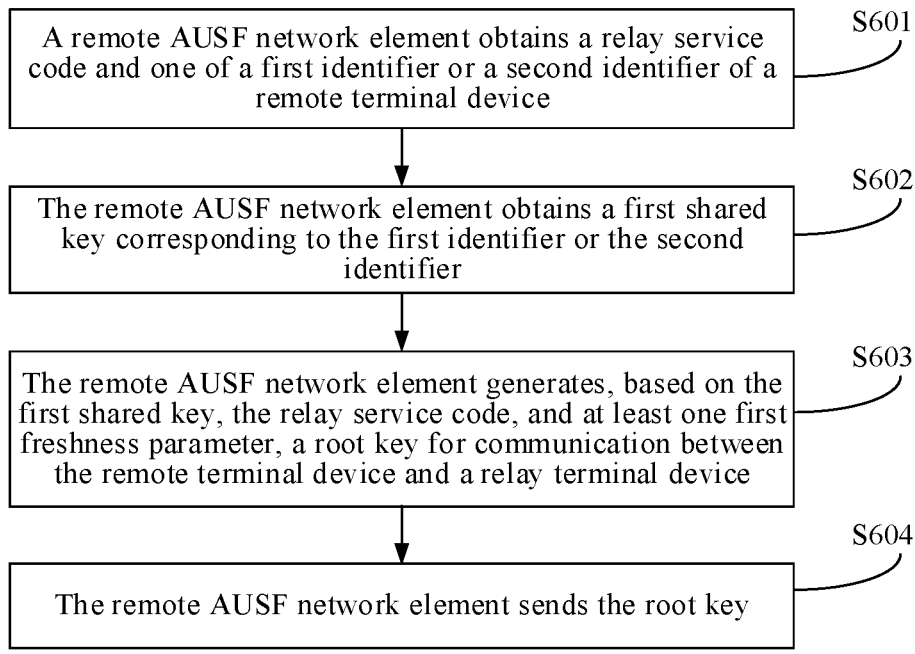
FIG. 6 is a schematic flowchart 5 of a key obtaining method according to an embodiment of this application.

As shown in FIG. 6, on a network side, steps performed by a remote AUSF network element in the key obtaining method include the following steps.

S601: The remote AUSF network element obtains a relay service code and one of a first identifier or a second identifier of a remote terminal device.

Optionally, the remote AUSF network element receives a first random number.

Optionally, the remote AUSF network element may further receive first verification information. For the first verification information, refer to the foregoing descriptions. Details are not repeated herein again.

As described above, the second identifier may be a permanent identifier (for example, a SUPI) of the remote terminal device, and the first identifier may be an identifier (for example, a P-KID) that is of the remote terminal device and that is corresponding to the relay service code.

The remote AUSF network element may receive the relay service code from the remote terminal device, and forwards the relay service code through, for example, a remote AMF network element, a relay terminal device, or a PKMF network element. For the relay service code, refer to the foregoing descriptions. Details are not repeated herein again.

The remote AUSF network element obtains one of the first identifier or the second identifier of the remote terminal device in the following manners:

In a possible implementation, the remote AUSF network element receives one of the first identifier or the second identifier of the remote terminal device. For example, the remote AUSF network element may receive one of the first identifier or the second identifier of the remote terminal device from the PKMF network element.

When the remote AUSF network element receives the first identifier of the remote terminal device, the method further includes: The remote AUSF network element may generate the first identifier in a same manner (for example, Manner 2 or Manner 3) as that of the remote terminal device in step S501.

In another possible implementation, the remote AUSF network element may generate the first identifier in a manner (for example, Manner 2 or Manner 3) that is the same as that of the remote terminal device in step S501.

For example, the AUSF network element may generate a temporary identifier based on a first shared key and the relay service code, and obtain the first identifier based on the temporary identifier. For details, refer to how the remote terminal device generates the first identifier in Manner 2 in step S501.

Similar to the remote terminal device, that the remote AUSF network element generates a temporary identifier based on a first shared key and the relay service code may include: The remote terminal device generates the temporary identifier based on the first shared key, the relay service code, and a second freshness parameter. For details, refer to how the remote terminal device generates the temporary identifier in Manner 2 in step S501.

For another example, the remote AUSF network element may generate the first identifier based on a second freshness parameter, a route indication, and a home network identifier of the remote terminal device. For details, refer to how the remote terminal device generates the first identifier in Manner 3 in step S501. For the second freshness parameter, refer to the foregoing descriptions. Details are not repeated herein again.

In addition, the remote AUSF network element may send the second freshness parameter, and forward the second freshness parameter to the remote terminal device through the relay terminal device, so that the remote terminal device receives the second freshness parameter.

After generating the first identifier, the remote AUSF network element may send the first identifier corresponding to the relay service code to the relay terminal device, and the relay terminal device forwards the first identifier to the remote terminal device, so that the remote terminal device obtains the first identifier, that is, corresponding to Manner 1 in which the remote terminal device obtains the first identifier in step S501.

The remote AUSF network element may alternatively send the first identifier to a UDM network element, so that another network element (for example, the PKMF network element) obtains an instance identifier of the remote AUSF network element and/or the SUPI of the remote terminal device from the UDM network element. The instance identifier of the remote AUSF network element is used to determine the remote AUSF network element serving the remote terminal device.

S602: The remote AUSF network element obtains a first shared key corresponding to the first identifier or the second identifier.

For the first shared key, refer to the foregoing descriptions. Details are not repeated herein again.

The remote AUSF network element may locally query the first shared key corresponding to the first identifier or the second identifier.

S603: The remote AUSF network element generates, based on the first shared key, the relay service code, and at least one first freshness parameter, a root key for communication between the remote terminal device and the relay terminal device.

For the first freshness parameter, refer to the foregoing descriptions. Details are not repeated herein again. It is to be noted that the first freshness parameter herein may be a value of a counter locally maintained by each of the remote terminal device and the remote AUSF network element.

The remote AUSF network element may generate the root key in a manner that is the same as that of the remote terminal device. For details, refer to the related descriptions in step S502. Details are not repeated herein.

After receiving the first verification information and before generating the root key, similar to the remote terminal device, the remote AUSF network element may generate the first temporary key based on the first shared key, and obtain third verification information based on the first temporary key and all or some information elements of a message that carries the first verification information; and compares the first verification information with the third verification information to verify the remote terminal device, and may generate the root key when the verification succeeds. For how the remote AUSF network element performs verification, refer to the foregoing descriptions of the first verification information. Details are not repeated herein.

Similarly, similar to the remote terminal device, the remote AUSF network element may generate the first temporary key based on the first shared key and at least one of the following: the relay service code, a third freshness parameter, the second identifier, and the first identifier of the remote terminal device. For details, refer to the related descriptions of the remote terminal device. Details are not repeated herein.

Optionally, the remote AUSF network element generates a second shared key Kp in a same manner as that of the remote terminal device. For example, the second shared key Kp is generated based on the relay service code and the first shared key (for example. Kausf), and the second shared key Kp is sent to the PKMF network element. For details, refer to the foregoing manner in which the remote terminal device generates the second shared key Kp.

S604: The remote AUSF network element sends the root key.

The remote AUSF network element may send the root key to the PKMF network element, and send the root key to the relay terminal device through the PKMF network element.

Optionally, the remote AUSF network element may further send the at least one first freshness parameter for generating the root key. For example, the at least one first freshness parameter includes a second random number. The remote AUSF network element may send the second random number, and forward the second random number to the remote terminal device through the relay remote device.

According to the key obtaining method provided in this embodiment of this application, the remote AUSF network element obtains the relay service code and one of the first identifier or the second identifier of the remote terminal device. The second identifier is the permanent identifier of the remote terminal device, and the first identifier is the identifier that is of the remote terminal device and that is corresponding to the relay service code. The remote AUSF network element obtains the first shared key corresponding to the first identifier or the second identifier. The first shared key is the key shared between the remote terminal device and the remote AUSF network element. The remote AUSF network element generates, based on the first shared key, the relay service code, and the at least one first freshness parameter, the root key for communication between the remote terminal device and the relay terminal device. The remote AUSF sends the root key. The first identifier is used by the remote AUSF network element to determine a corresponding first shared key, so that the remote terminal device and the remote AUSF network element can generate, in a same manner, the root key for communication between the remote terminal device and the relay terminal device, to implement key sharing between the remote terminal device and the relay terminal device.

Figure 7:
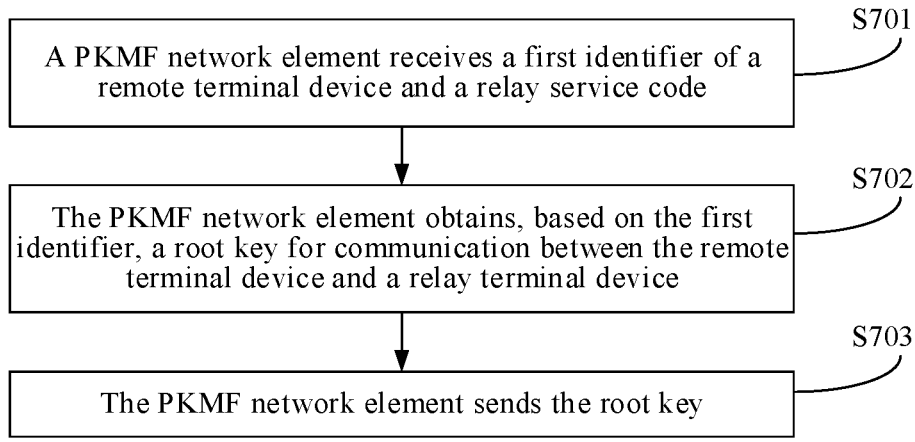
FIG. 7 is a schematic flowchart 6 of a key obtaining method according to an embodiment of this application.

As shown in FIG. 7, on a network side, steps performed by a PKMF network element in the key obtaining method include the following steps.

S701: The PKMF network element receives a first identifier of a remote terminal device and a relay service code.

Optionally, the PKMF network element receives a first random number.

Optionally, the PKMF network element receives second verification information. For the second verification information, refer to the foregoing descriptions. Details are not repeated herein again.

The first identifier may be an identifier (for example, a P-KID) that is of the remote terminal device and that is corresponding to the relay service code, or the first identifier may be an anonymous identifier (for example, SUCI) of the remote terminal device.

In a possible implementation, the PKMF network element may receive the first identifier and the relay service code from the remote terminal device through a relay terminal device.

S702: The PKMF network element obtains, based on the first identifier, a root key for communication between the remote terminal device and the relay terminal device.

In a possible implementation, the PKMF network element sends the first identifier to a UDM network element, and correspondingly receives identification information (for example, an instance identifier of the remote AUSF network element) of the remote AUSF from the UDM network element. The PKMF network element sends the first identifier to the corresponding remote AUSF network element based on the identification information, and correspondingly receives the root key from the remote AUSF network element.

In another possible implementation, the PKMF network element sends the first identifier to a UDM network element; and correspondingly receives identification information of the remote AUSF network element and a permanent identifier (for example, a SUPI) of the remote terminal device from the UDM network element. The PKMF network element sends the permanent identifier of the remote terminal device to the corresponding remote AUSF network element based on the identification information, and correspondingly receives the root key from the remote AUSF network element.

The two implementations are corresponding to step S601 in which the remote AUSF network element obtains one of the first identifier or the second identifier of the remote terminal device.

In a still another possible implementation, the PKMF network element receives at least one second shared key from the remote AUSF network element. The PKMF network element generates, based on the at least one first freshness parameter and the second shared key corresponding to the first identifier, the root key for communication between the remote terminal device and the relay terminal device. Optionally, the PKMF network element generates, based on the relay service code, the second shared key corresponding to the first identifier, and the at least one first freshness parameter, the root key for communication between the remote terminal device and the relay terminal device.

After receiving the second verification information and before generating the root key, similar to the remote terminal device, the PKMF network element may generate fourth verification information based on the first freshness parameter and the second shared key, compare the first verification information with the third verification information to verify the remote terminal device, and generate the root key when the verification succeeds. For how the PKMF network element performs verification, refer to the foregoing descriptions of the second verification information. Details are not repeated herein.

For the first freshness parameter, refer to the foregoing descriptions. Details are not repeated herein again. It is to be noted that the first freshness parameter herein may be a value of a counter locally maintained by each of the remote terminal device and the PKMF network element.

S703: The PKMF network element sends the root key

Optionally, the PKMF network element may further send the at least one first freshness parameter for generating the root key. For example, the at least one first freshness parameter includes a second random number. The PKMF network element may send the second random number, and forward the second random number to the remote terminal device through the relay remote device.

According to the key obtaining method provided in this embodiment of this application, the PKMF network element receives the relay service code and the first identifier of the remote terminal device. The first identifier is the identifier that is of the remote terminal device and that is corresponding to the relay service code, or the first identifier is the anonymous identifier of the remote terminal device. The PKMF network element obtains, based on the first identifier, the root key for communication between the remote terminal device and the relay terminal device. The root key is generated based on the first shared key, the relay service code, and the at least one first freshness parameter, and the first shared key is the key shared between the remote terminal device and a remote authentication service function network element. The PKMF network element sends the root key. The first identifier is used by the PKMF network element to determine a corresponding second shared key, so that the remote terminal device and the PKMF network element can generate, in a same manner, the root key for communication between the remote terminal device and the relay terminal device, to implement key sharing between the remote terminal device and the relay terminal device.

An embodiment of this application provides another key obtaining method. A remote terminal device actively requests, from a remote AUSF network element, a first identifier corresponding to a relay service code, so that the remote AUSF network element can generate the corresponding first identifier based on the relay service code. The first identifier is used to discover a remote UDM network element, and store the generated first identifier in the remote UDM network element. In an indirect communication process, the remote terminal device initiates a direct communication request to a relay terminal device. The direct communication request includes the first identifier. The relay terminal device initiates, to a network side through a signaling plane, a key request that includes the first identifier. A PKMF network element determines, through the remote UDM network element, the remote AUSF network element corresponding to the first identifier, and obtains, from the remote AUSF network element, a root key for communication between the remote terminal device and the relay terminal device.

Figure 8A:
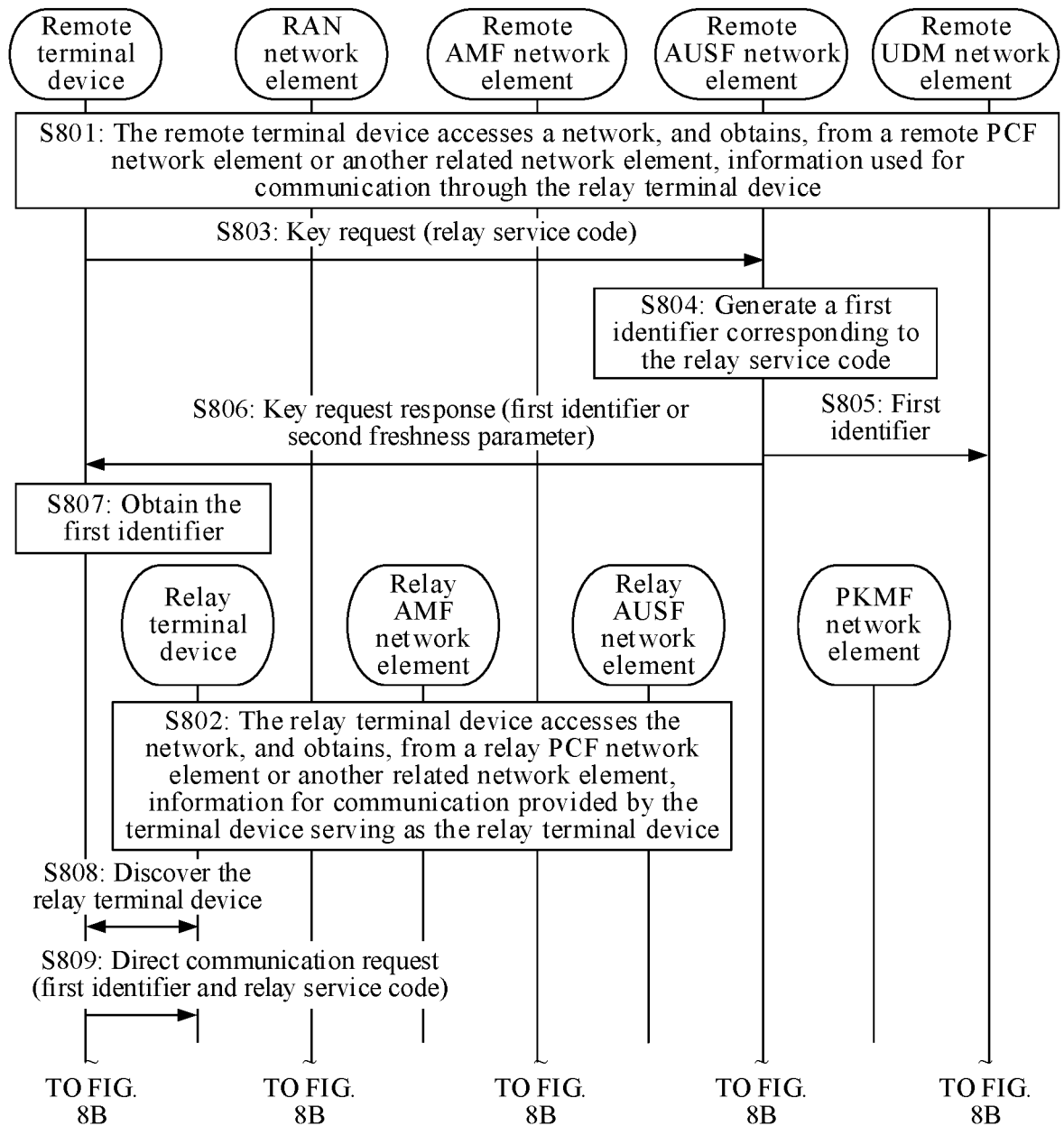
FIG. 8A and FIG. 8B is a schematic flowchart 7 of a key obtaining method according to an embodiment of this application.
Figure 8B:
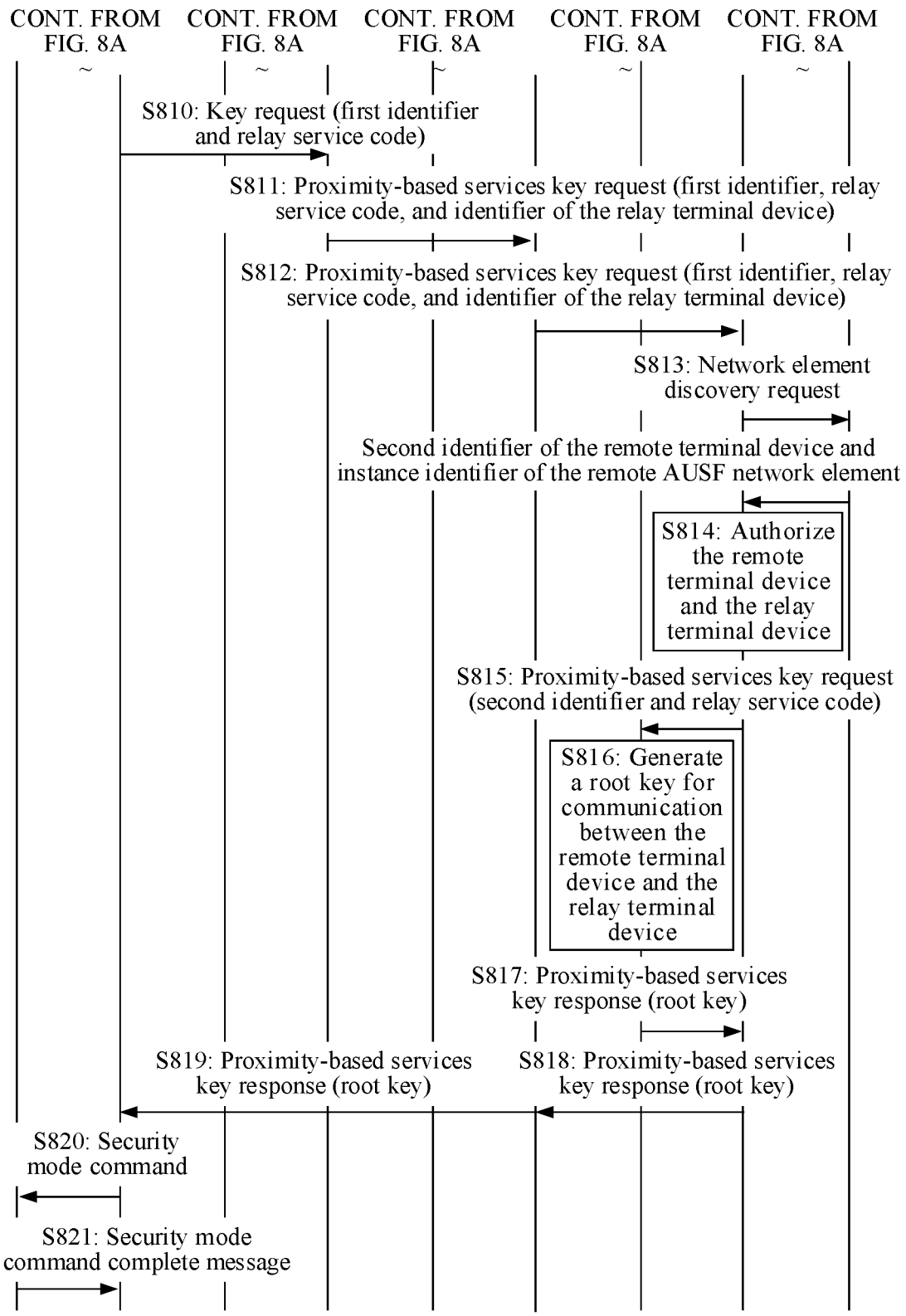

As shown in FIG. 8A and FIG. 8B, the key obtaining method includes the following steps.

S801: The remote terminal device accesses a network, and obtains, from a remote PCF network element or another related network element, information used for communication through the relay terminal device.

The information includes indication information indicating whether the terminal device is authorized to access a 5GC through a relay (that is, the terminal device serves as the remote terminal device), a relay service code, and the like.

S802: The relay terminal device accesses the network, and obtains, from a relay PCF network element or another related network element, information for communication provided by the terminal device serving as the relay terminal device.

The information includes indication information indicating whether the terminal device is authorized to act as the relay; and the relay service code and the like.

It is to be noted that an execution sequence of steps S801 and S802 is not limited.

S803: The remote terminal device sends a key request to the remote AUSF network element through a remote AMF network element.

The key request includes at least one relay service code.

Optionally, the remote AMF network element performs authorization check, to be specific, checks whether the remote terminal device is authorized to serve as the remote terminal device of the relay terminal device, or checks whether the remote terminal device is authorized to obtain, through the relay terminal device, a service corresponding to the relay service code.

S804: The remote AUSF network element generates a first identifier (for example, a P-KID) that is of the remote terminal device and that is corresponding to each relay service code.

For a process of generating the first identifier, refer to step S601.

S805: The remote AUSF network element sends the first identifier of the remote terminal device to the UDM network element.

The remote UDM network element locally stores the first identifier of the remote terminal device as a context of the remote terminal device. Optionally, if the remote UDM network element stores the context of the remote terminal device in a unified data repository (UDR) network element, the first identifier of the remote terminal device is also stored in a terminal device context of the UDR network element.

S806: The remote AUSF network element sends a key request response to the remote terminal device through the remote AMF network element.

The key request response includes the first identifier corresponding to the relay service code or a second freshness parameter used for generating the first identifier.

Correspondingly, the remote terminal device receives, from the remote AUSF network element through the remote AMF network element, the first identifier corresponding to the relay service code or the second freshness parameter used for generating the first identifier.

If the second freshness parameter is used in a process of generating the first identifier, the key request response may include the first identifier corresponding to the relay service code or the second freshness parameter used for generating the first identifier. If the second freshness parameter is not used in the process of generating the first identifier, the key request response includes the first identifier corresponding to the relay service code.

Optionally, if the received key request includes a plurality of relay service codes, that is, there are also a plurality of requested first identifiers, the key request response may further include a plurality of relay service codes respectively corresponding to the plurality of first identifiers (or second freshness parameters). That is, the first identifiers (or the second freshness parameters) in the key request response are in a one-to-one correspondence with the relay service codes. Alternatively, the key request response includes a plurality of first identifiers (or second freshness parameters) that are not corresponding to relay service codes, which are freely selected by the remote terminal device to perform a corresponding operation.

S807: The remote terminal device obtains the first identifier.

If the first identifier is received in step S806, the remote terminal device directly stores the first identifier.

If the second freshness parameter is received in step S806, the remote terminal device generates the first identifier in a manner that is the same as that of the remote AUSF network element, for example, generates the first identifier in Manner 2 or Manner 3 in step S501. It is to be noted that a process in which the remote terminal device generates the first identifier may be performed before step S809.

S808: The remote terminal device performs a discovery procedure to discover the relay terminal device.

S809: The remote terminal device sends the direct communication request to the relay terminal device.

The direct communication request includes the first identifier (for example, the P-KID) of the remote terminal device and the relay service code. If there are a plurality of relay service codes, the remote terminal device may determine corresponding first identifiers based on the relay service codes.

Optionally, the direct communication request may further include a first random number (Nonce 1).

Optionally, the direct communication request may further include first verification information.

For how to generate the first verification information, refer to step S501.

S810: The relay terminal device sends a key request to a relay AMF network element.

The key request includes the first identifier (for example, the P-KID) and the relay service code.

Optionally, the key request may further include the first random number.

Optionally, the key request may further include the first verification information (for example, MAC-I).

S811: The relay AMF network element selects a relay AUSF network element, and sends a proximity-based services key request to the relay AUSF network element.

The proximity-based services key request includes the first identifier (for example, the P-KID), the relay service code, and an identifier of the relay terminal device (relay UE ID) (for example, a SUPI).

Optionally, the proximity-based services key request may further include the first random number.

Optionally, the proximity-based services key request may further include the first verification information (for example, the MAC-I).

Optionally, the relay AMF network element performs authorization check, to be specific, checks whether the relay terminal device is authorized to serve as the relay terminal device, or checks whether the relay terminal device is authorized to provide a connection service corresponding to the relay service code for the remote terminal device.

S812: The relay AUSF network element selects a PKMF network element, and sends the proximity-based services key request to the PKMF network element.

Information carried in the proximity-based services key request is the same as information carried in the proximity-based services key request in step S811.

S813: The PKMF network element selects a remote UDM network element based on the first identifier (for example, the P-KID) in the proximity-based services key request, and sends a network element discovery request to the remote UDM network element.

The network element discovery request includes the first identifier (for example, the P-KID).

The remote UDM network element obtains an instance identifier of the remote AUSF network element based on the first identifier (for example, the P-KID), and sends the instance identifier to the PKMF network element. The instance identifier of the AUSF network element may be an identifier that can uniquely identify the remote AUSF, for example, a fully qualified domain name (FQDN) or an address of the AUSF. This is not limited herein.

Optionally, the PKMF network element may further obtain a second identifier (for example, a SUPI) of the remote terminal device.

S814: The PKMF network element authorizes the remote terminal device and the relay terminal device.

If the PKMF network element obtains the second identifier of the remote terminal device in step S813, the PKMF network element determines, based on the second identifier (for example, the SUPI) of the remote terminal device and the relay service code, whether to authorize the remote terminal device to obtain, through the relay terminal device, a service corresponding to the relay service code.

The PKMF network element determines, based on the identifier (relay UE ID, for example, the SUPI) of the relay terminal device and the relay service code, whether to authorize the relay terminal device to serve as a relay to provide a service corresponding to the relay service code. If the authorization succeeds, a subsequent procedure continues. Otherwise, a rejection procedure is initiated.

It is to be noted that the authorization process of the PKMF is optional, and may occur after step S815.

S815: The PKMF network element sends the proximity-based services key request to the remote AUSF network element.

The proximity-based services key request includes the second identifier (for example, the SUPI) or the first identifier of the remote terminal device, and the relay service code.

Optionally, the proximity-based services key request may further include the first random number.

Optionally, the proximity-based services key request may further include the first verification information (for example, the MAC-I).

S816: The remote AUSF network element generates, based on a first shared key, the relay service code, and at least one first freshness parameter, a root key for communication between the remote terminal device and the relay terminal device.

The at least one first freshness parameter herein may include the first random number (Nonce 1), may include a second random number (Nonce 2) generated by the remote AUSF network element, include the first random number and the second random number, or include a value of a counter locally maintained by the remote AUSF network element. The counter locally maintained by the remote AUSF network element and a counter locally maintained by the remote terminal device use a same initial value and a same counting rule, so that values of the two counters are consistent. A specific implementation of the first freshness parameter is not limited.

For a process of generating the root key, refer to step S603.

It is to be noted that, if the proximity-based services key request includes the first verification information, the remote AUSF network element generates third verification information in a same manner as that of the terminal device, and performs verification by comparing the first verification information with the third verification information. A root key is generated after the verification passes.

S817: The remote AUSF network element sends a proximity-based services key response to the PKMF network element.

The proximity-based services key response may include the root key, and optionally, may further include the second random number.

S818: The PKMF network element sends the proximity-based services key response to the relay AUSF network element.

The proximity-based services key response may include the root key, and optionally, may further include the second random number.

S819: The relay AUSF network element sends the proximity-based services key response to the relay terminal device through the relay AMF network element.

The proximity-based services key response may include the root key, and optionally, may further include the second random number.

S820: The relay terminal device sends a security mode command to the remote terminal device.

Optionally, the security mode command includes the second random number.

Optionally, the relay terminal device generates a fourth random number, and includes the fourth random number in the security mode command message.

The remote terminal device generates the root key by using a method that is the same as that of the remote AUSF network element.

Optionally, the relay terminal device may generate a session key between the relay terminal device and the remote terminal device based on the received root key. Further, optionally, the relay terminal device may generate an encryption key and/or an integrity protection key of a signaling plane and/or a user plane based on the session key.

Alternatively, optionally, the relay terminal device may generate an encryption key and/or an integrity protection key of a signaling plane and/or a user plane based on the received root key.

Optionally, the security mode command message includes a message authentication code, and the message authentication code is generated based on the integrity protection key of the signaling plane.

S821: The remote terminal device sends a security mode command complete message to the relay terminal device.

In the foregoing key obtaining method, the remote terminal device obtains the first identifier corresponding to the relay service code. The first identifier enables the relay terminal device to obtain, from the network side through the signaling plane, the root key for communication between the remote terminal device and the relay terminal device. Optionally, before obtaining the root key, the PKMF network element first performs authorization check on the remote terminal device and the relay terminal device, to ensure that only the authorized terminal device obtains the root key. The root key is generated based on parameters such as the first shared key Kausf and the relay service code.

An embodiment of this application provides another key obtaining method. A remote terminal device actively requests, from a remote AUSF network element, a first identifier corresponding to a relay service code, so that the remote AUSF network element can generate the corresponding first identifier and a second shared key based on the relay service code, and send the first identifier and the second shared key to a PKMF network element. In an indirect communication process, the remote terminal device initiates a direct communication request to a relay terminal device. The direct communication request includes the first identifier. The relay terminal device initiates, to a network side through a signaling plane, a key request including the first identifier. The PKMF network element obtains the corresponding second shared key Kp based on the first identifier, and generates a root key for communication between the remote terminal device and the relay terminal device. A difference from FIG. 8A and FIG. 8B lies in that the remote AUSF network element pushes the first identifier of the remote terminal device and the second shared key Kp to the PKMF network element in advance. Alternatively, the remote AUSF network element pushes the second shared key Kp to the PKMF network element in advance, and the PKMF generates the first identifier of the remote terminal device.

Figure 9A:
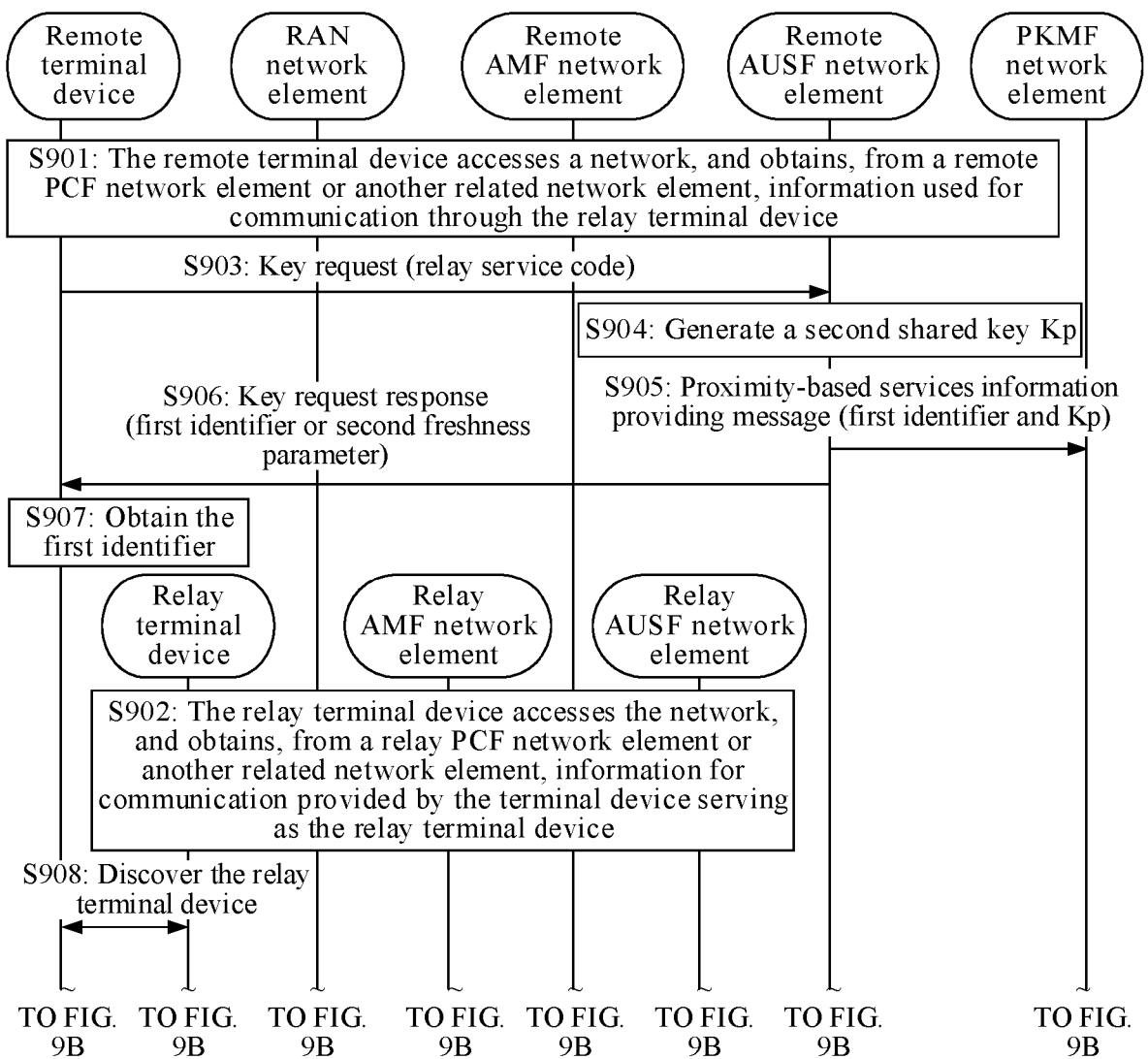
FIG. 9A and FIG. 9B is a schematic flowchart 8 of a key obtaining method according to an embodiment of this application.
Figure 9B:
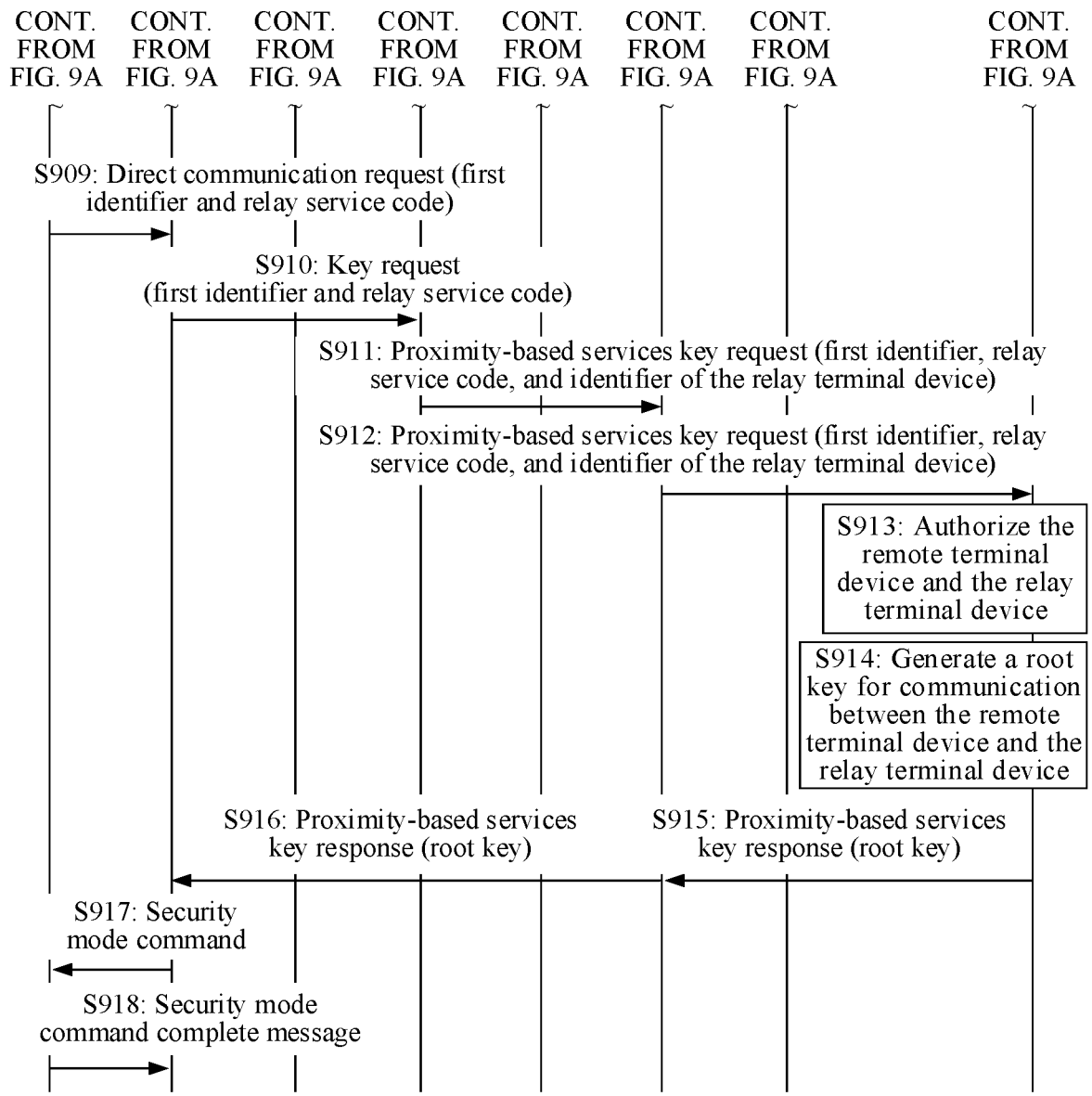

As shown in FIG. 9A and FIG. 9B, the key obtaining method includes the following steps.

S901: The remote terminal device accesses a network, and obtains, from a remote PCF network element or another related network element, information used for communication through the relay terminal device.

This step is the same as step S801, and details are not described herein again.

S902: The relay terminal device accesses the network, and obtains, from a relay PCF network element or another related network element, information for communication provided by the terminal device serving as the relay terminal device.

This step is the same as step S802, and details are not described herein again.

S903: The remote terminal device sends a key request to the remote AUSF network element through a remote AMF network element.

This step is the same as step S803, and details are not described herein again.

S904: The remote AUSF network element generates the second shared key Kp.

For a process of generating the second shared key Kp, refer to step S603.

Optionally, the remote AUSF network element generates a first identifier (for example, a P-KID) that is of the terminal device and that is corresponding to each relay service code. For a process of generating the first identifier, refer to step S601.

S905: The remote AUSF network element selects the PKMF network element, and sends a proximity-based services information providing message to the PKMF network element.

A manner in which the remote AUSF network element selects the PKMF network element includes but is not limited to the following several possible manners:

Manner 1: The remote AUSF network element determines the PKMF network element based on the relay service code. For example, the remote AUSF network element sends the relay service code to a remote NRF network element or the remote PCF network element, to obtain the PKMF network element corresponding to the relay service code. Alternatively, the relay service code includes routing information, and the remote AUSF network element selects the PKMF network element based on the routing information.

Manner 2: The remote terminal device includes discovery information (where the information is obtained from the remote PCF network element or the another related network element in step S901) of the PKMF network element in the key request, and the remote AMF network elements forwards the key request to the remote AUSF network element.

Manner 3: The remote AMF network element includes discovery information of the PKMF network element in the key request (where the information is obtained from the remote PCF network element or the another related network element in step S901).

The discovery information of the PKMF network element is used by the AUSF network element to determine the PKMF network element, and the discovery information of the PKMF network element may be routing information, address information of the PKMF network element, an identifier of the PKMF network element, or the like.

The proximity-based services information providing message includes a second identifier (for example, a SUPI) of the remote terminal device and the second shared key Kp. and optionally, may further include the relay service code and the first identifier of the remote terminal device.

The PKMF network element stores the received second identifier (for example, the SUPI) of the remote terminal device, the first identifier (if received) of the remote terminal device, and the second shared key Kp, and optionally, may further store the relay service code.

Optionally, the PKMF network element may store the foregoing information only after determining that the remote terminal device is authorized to obtain the relay service code.

Optionally, if the proximity-based services information providing message does not include the first identifier, the PKMF network element generates the first identifier. In this case, optionally, the PKMF network element sends the generated first identifier or a second freshness parameter to the remote AUSF network element.

S906: The remote AUSF network element sends a key request response to the remote terminal device through the remote AMF network element.

This step is the same as step S806.

S907: The remote terminal device obtains the first identifier.

This step is the same as step S807. It is to be noted that a process in which the remote terminal device generates the first identifier may be performed before step S909.

S908: The remote terminal device performs a discovery procedure to discover the relay terminal device.

This step is the same as step S808.

S909: The remote terminal device sends the direct communication request to the relay terminal device.

A difference between this step and step S809 lies in that the remote terminal device may generate the second verification information instead of the first verification information. For a process of generating the second verification information, refer to step S501. In addition, the direct communication request may optionally include the second verification information instead of the first verification information. Other content is the same.

S910: The relay terminal device sends a key request to a relay AMF network element.

A difference between this step and step S810 lies in that the key request may optionally include the second verification information instead of the first verification information. Other content is the same.

S911: The relay AMF network element selects a relay AUSF network element, and sends a proximity-based services key request to the AUSF network element.

A difference between this step and step S811 lies in that the proximity-based services key request may optionally include the second verification information instead of the first verification information. Other content is the same.

S912: The relay AUSF network element selects the PKMF network element, and sends the proximity-based services key request to the PKMF network element.

A difference between this step and step S812 lies in that a manner in which the relay AUSF network element selects the PKMF network element is the same as a manner in which the remote AUSF network element selects the PKMF network element in step S905. In addition, the proximity-based services key request may optionally include the second verification information instead of the first verification information. Other content is the same.

S913: The PKMF network element authorizes the remote terminal device and the relay terminal device.

This step is the same as step S814. This step is optional.

S914: The remote PKMF network element generates, based on the second shared key Kp and at least one first freshness parameter, the root key for communication between the remote terminal device and the relay terminal device.

The first freshness parameter herein may include a first random number (Nonce 1), may include a second random number (Nonce 2) generated by the PKMF, include the first random number and the second random number, or may include a value of a counter locally maintained by the remote terminal device and a value of a counter locally maintained by the PKMF network element. When the remote terminal device and the PKMF network element locally maintain their respective counters, a same initial value and a same counting rule are used, so that the values of the two counters are consistent.

For a process of generating the root key, refer to step S702.

It is to be noted that, if the proximity-based services key request includes the second verification information, the PKMF network element generates fourth verification information in a same manner as that of the terminal device, and performs verification by comparing the second verification information with the fourth verification information. The root key is generated after the verification passes.

It is to be noted that an execution sequence of the foregoing verification process and step S913 is not limited.

S915: The PKMF network element sends a proximity-based services key response to the relay AUSF network element.

This step is the same as step S818.

S916: The relay AUSF network element sends the proximity-based services key response to the relay terminal device through the relay AMF network element.

This step is the same as step S819.

S917: The relay terminal device sends a security mode command to the remote terminal device.

This step is the same as step S820.

S918: The remote terminal device sends a security mode command complete message to the relay terminal device.

This step is the same as step S821.

In the foregoing key obtaining method, the remote terminal device obtains the first identifier corresponding to the relay service code. The first identifier enables the relay terminal device to obtain, from the network side through the signaling plane, the root key for communication between the remote terminal device and the relay terminal device. Further, before obtaining the root key, the PKMF network element first performs authorization check on the remote terminal device and the relay terminal device, to ensure that only the authorized terminal device obtains the root key. The root key is generated based on parameters such as a first shared key Kausf and the relay service code.

An embodiment of this application provides another key obtaining method. A remote terminal device actively requests, from a PKMF network element through a remote AMF network element, a first identifier corresponding to a relay service code. Then, the PKMF network element requests the first identifier from a remote AUSF network element, so that the remote AUSF network element can generate the corresponding first identifier and a second shared key based on the relay service code, and send the first identifier and the second shared key to the PKMF network element. In an indirect communication process, the remote terminal device initiates a direct communication request to a relay terminal device. The direct communication request includes the first identifier. The relay terminal device initiates, to a network side through a signaling plane, a key request including the first identifier. The PKMF network element obtains the corresponding second shared key based on the first identifier, and generates a root key for communication between the remote terminal device and the relay terminal device. A difference from FIG. 9A and FIG. 9B lies in that the remote AMF network element directly communicates with the PKMF network element.

Figure 10A:
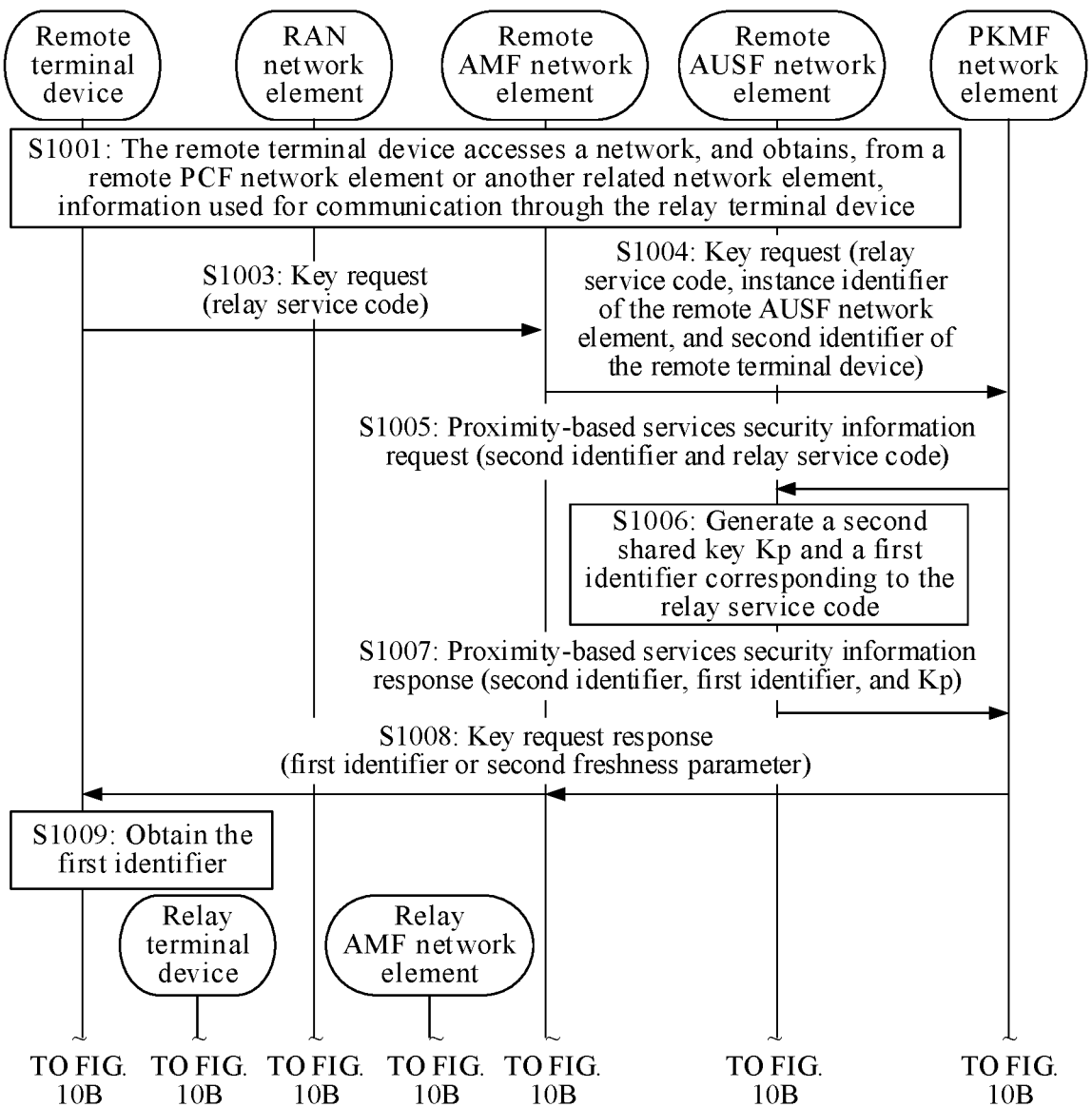
FIG. 10A and FIG. 10B is a schematic flowchart 9 of a key obtaining method according to an embodiment of this application.
Figure 10B:
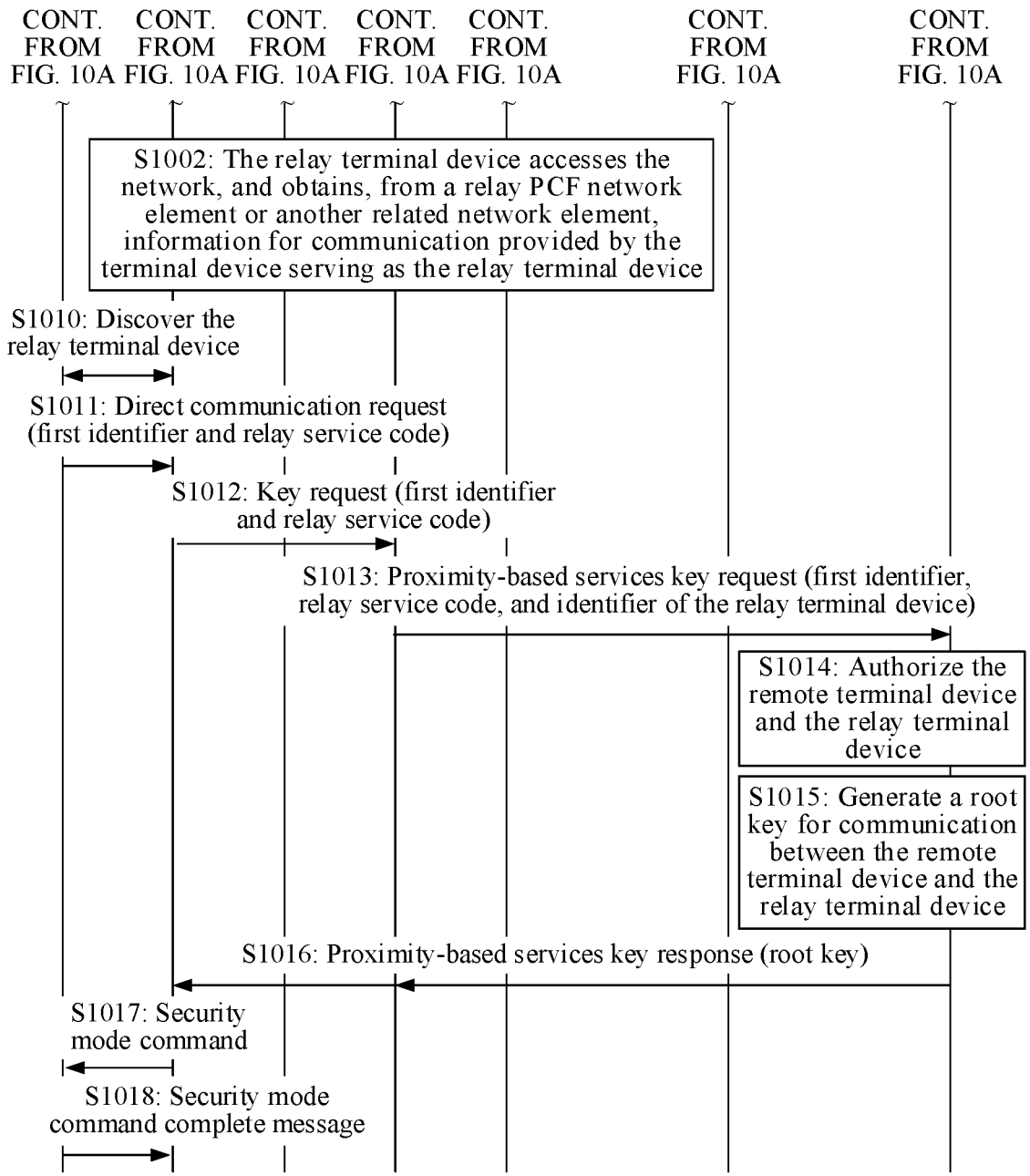

As shown in FIG. 10A and FIG. 10B, the key obtaining method includes the following steps.

S1001: The remote terminal device accesses a network, and obtains, from a remote PCF network element or another related network element, information used for communication through the relay terminal device.

This step is the same as step S801, and details are not described herein again.

S1002: The relay terminal device accesses the network, and obtains, from a relay PCF network element or another related network element, information for communication provided by the terminal device serving as the relay terminal device.

This step is the same as step S802, and details are not described herein again.

S1003: The remote terminal device sends a key request to the remote AMF network element.

The key request includes at least one relay service code.

Optionally, the remote AMF network element performs authorization check, to be specific, checks whether the remote terminal device is authorized to serve as the remote terminal device of the relay terminal device, or checks whether the remote terminal device is authorized to obtain, through the relay terminal device, a service corresponding to the relay service code.

S1004: The remote AMF network element selects the PKMF network element, and sends the key request to the PKMF network element.

A manner in which the remote AMF network element selects the PKMF network element is the same as a manner in which the remote AUSF network element selects the PKMF network element in step S905.

The key request includes the relay service code, an instance identifier of the remote AUSF network element, and a second identifier (for example, a SUPI) of the remote terminal device.

If the key request in step S1003 includes a plurality of relay service codes that are corresponding to different PKMF network elements, the remote AMF network element sends the key request to each PKMF network element.

S1005: The PKMF network element sends proximity-based services security information request to the remote AUSF network element.

The request includes the second identifier (for example, the SUPI) of the remote terminal device and the relay service code.

Optionally, before sending the message, the PKMF network element determines, based on the second identifier (for example, the SUPI) of the remote terminal device and the relay service code, whether the remote terminal device is authorized to obtain, through the relay terminal device, a service corresponding to the relay service code.

S1006: The remote AUSF network element generates a second shared key Kp and a first identifier (for example, a P-KID) that is of the remote terminal device and that is corresponding to each relay service code.

This step is the same as step S904.

S1007: The remote AUSF network element sends a proximity-based services security information response to the PKMF network element.

The proximity-based services security information response includes the second shared key Kp, and optionally, may further include the relay service code, the second identifier (for example, the SUPI) of the remote terminal device, and the first identifier of the remote terminal device.

S1008: The PKMF network element sends a key request response to the remote terminal device through the remote AMF network element.

For information included in the key request response, refer to step S806. Details are not described herein again.

S1009: The remote terminal device obtains the first identifier.

This step is the same as step S807. It is to be noted that a process in which the remote terminal device generates the first identifier may be performed before step S1011.

S1010: The remote terminal device performs a discovery procedure to discover the relay terminal device.

This step is the same as step S808.

S1011: The remote terminal device sends the direct communication request to the relay terminal device.

This step is the same as step S909.

S1012: The relay terminal device sends a key request to a relay AMF network element.

This step is the same as step S910.

S1013: The relay AMF network element selects the PKMF network element, and sends a proximity-based services key request to the PKMF network element.

A manner in which the relay AMF network element selects the PKMF network element is the same as a manner in which the remote AMF network element selects the PKMF network element in step S1004.

Information carried in the proximity-based services key request is the same as information carried in the proximity-based services key request in step S912.

Optionally, the relay AMF network element performs authorization check, to be specific, checks whether the relay terminal device is authorized to serve as the relay terminal device of a remote relay device, or checks whether the relay terminal device is authorized to provide a connection service corresponding to the relay service code for the remote terminal device.

S1014: Optionally, the PKMF network element authorizes the remote terminal device and the relay terminal device.

This step is the same as step S814.

S1015: The PKMF network element generates, based on the second shared key Kp and at least one first freshness parameter, the root key for communication between the remote terminal device and the relay terminal device.

This step is the same as step S914.

S1016: The PKMF network element sends a proximity-based services key response to the relay terminal device through the relay AMF network element.

Information carried in the proximity-based services key response is the same as information carried in the proximity-based services key response in step S818.

S1017: The relay terminal device sends a security mode command to the remote terminal device.

This step is the same as step S820.

S1018: The remote terminal device sends a security mode command complete message to the relay terminal device.

This step is the same as step S821.

In the foregoing key obtaining method, the remote terminal device obtains the first identifier corresponding to the relay service code. The first identifier enables the relay terminal device to obtain, from the network side through the signaling plane, the root key for communication between the remote terminal device and the relay terminal device. Further, before obtaining the root key, the PKMF network element first performs authorization check on the remote terminal device and the relay terminal device, to ensure that only the authorized terminal device obtains the root key. The root key is generated based on parameters such as a first shared key Kausf and the relay service code.

An embodiment of this application provides another key obtaining method. In an indirect communication process, a remote terminal device initiates a direct communication request to a relay terminal device. The direct communication request includes a SUCI of the remote terminal device. The relay terminal device initiates, to a network side through a signaling plane, a key request that includes the SUCI. A PKMF network element determines, through a remote UDM network element, a remote AUSF network element corresponding to the SUCI, and obtains, from the remote AUSF network element, a root key for communication between the remote terminal device and the relay terminal device. A difference from FIG. 8A and FIG. 8B lies in that the PKMF network element determines the remote AUSF network element based on the SUCI of the remote terminal device.

Figure 11A:
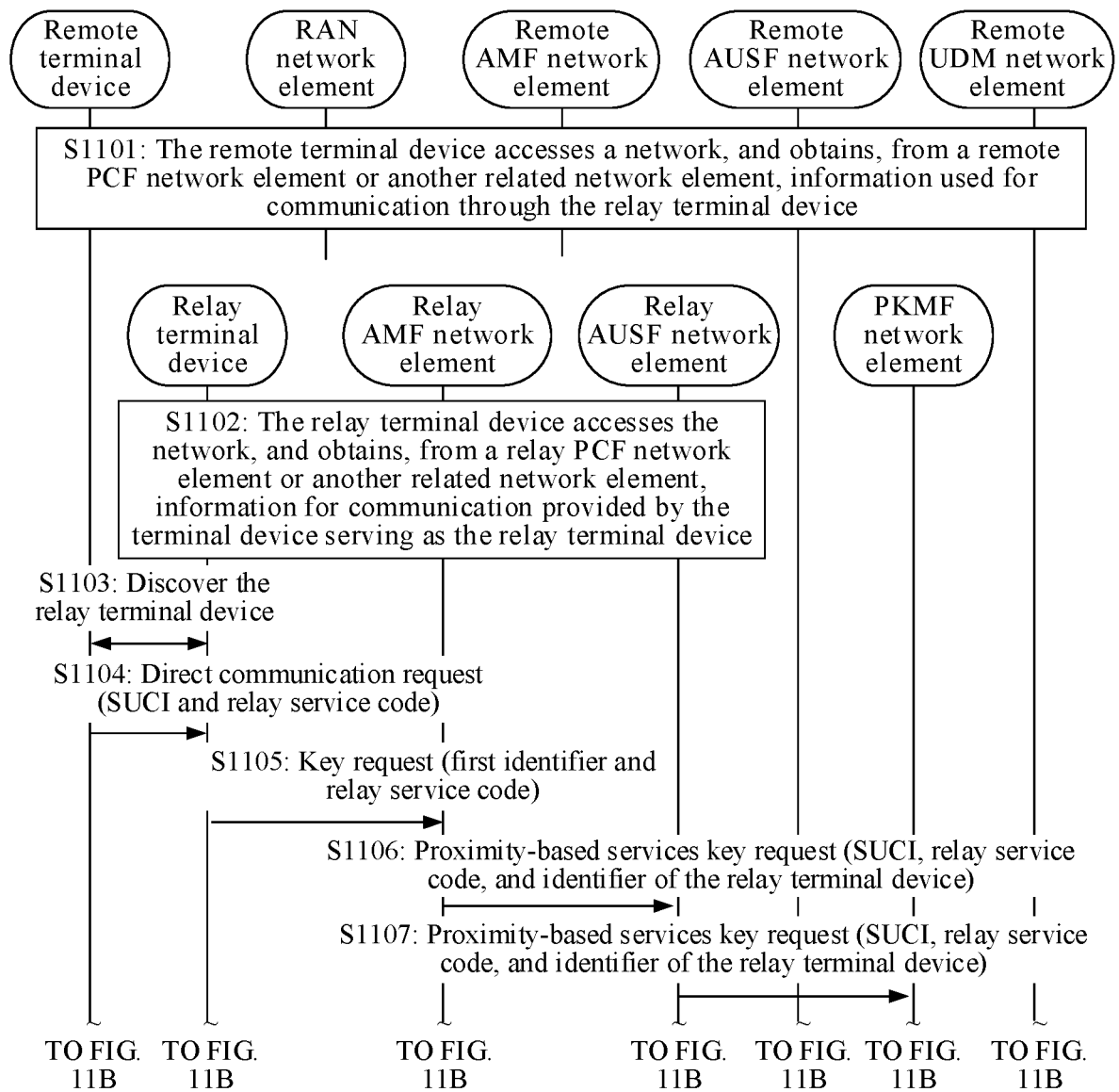
FIG. 11A and FIG. 11B is a schematic flowchart 10 of a key obtaining method according to an embodiment of this application.
Figure 11B:
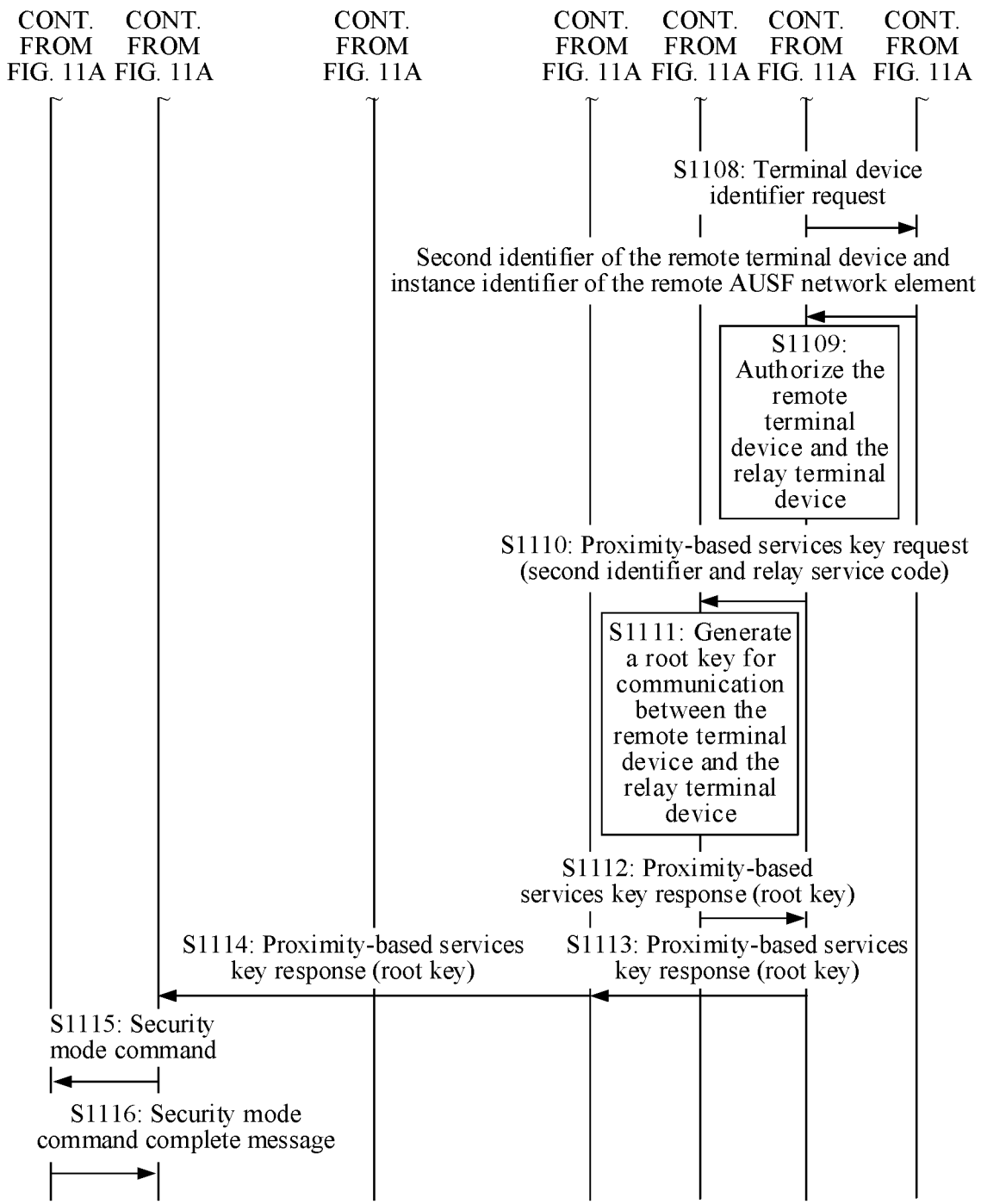

As shown in FIG. 11A and FIG. 11B, the key obtaining method includes the following steps.

S1101: The remote terminal device accesses a network, and obtains, from a remote PCF network element or another related network element, information used for communication through the relay terminal device.

This step is the same as step S801, and details are not described herein again.

S1102: The relay terminal device accesses the network, and obtains, from a relay PCF network element or another related network element, information for communication provided by the terminal device serving as the relay terminal device.

This step is the same as step S802, and details are not described herein again.

S1103: The remote terminal device performs a discovery procedure to discover the relay terminal device.

This step is the same as step S808.

S1104: The remote terminal device sends the direct communication request to the relay terminal device.

A difference between this step and step S809 lies in that a first identifier in the direct communication request may be the SUCI of the remote terminal device.

S1105: The relay terminal device sends a key request to a relay AMF network element.

A difference between this step and step S810 lies in that the first identifier in the key request may be the SUCI of the remote terminal device.

S1106: The relay AMF network element selects a relay AUSF network element, and sends a proximity-based services key request to the relay AUSF network element.

A difference between this step and step S811 lies in that the first identifier in the proximity-based services key request may be the SUCI of the remote terminal device.

S1107: The relay AUSF network element selects the PKMF network element, and sends the proximity-based services key request to the PKMF network element.

A difference between this step and step S812 lies in that the first identifier in the proximity-based services key request may be the SUCI of the remote terminal device.

S1108: The PKMF network element selects the remote UDM network element based on the first identifier (for example, the SUCI) in the proximity-based services key request, and sends a terminal device identifier (UE ID) to the remote UDM network element.

The terminal device identifier includes the first identifier (for example, the SUCI).

The remote UDM network element obtains, based on the first identifier (for example, SUCI), a second identifier (for example, a SUPI) of the remote terminal device and an instance identifier of the remote AUSF network element serving the remote terminal device, and sends the second identifier and the instance identifier to the PKMF network element.

S1109: The PKMF network element authorizes the remote terminal device and the relay terminal device.

This step is the same as step S814.

S1110: The PKMF network element sends the proximity-based services key request to the remote AUSF network element.

This step is the same as step S815.

S1111: The remote AUSF network element generates, based on a first shared key, the relay service code, and at least one first freshness parameter, the root key for communication between the remote terminal device and the relay terminal device.

This step is the same as step S816.

S1112: The remote AUSF network element sends a proximity-based services key response to the PKMF network element.

This step is the same as step S817.

S1113: The PKMF network element sends the proximity-based services key response to the relay AUSF network element.

This step is the same as step S818.

S1114: The relay AUSF network element sends the proximity-based services key response to the relay terminal device through the relay AMF network element.

This step is the same as step S819.

S1115: The relay terminal device sends a security mode command to the remote terminal device.

This step is the same as step S820.

S1116: The remote terminal device sends a security mode command complete message to the relay terminal device.

This step is the same as step S821.

It is to be noted that steps S811 and S812 are optional. The remote AMF network element may directly select the PKMF network element and send the proximity-based services key request to the PKMF network element. Content carried in the proximity-based services key request is the same as information carried in the proximity-based services key request in step S811.

In the foregoing key obtaining method, the remote terminal device generates the SUCI, so that the relay terminal device can obtain, from the PKMF network element based on the SUCI, the root key for communication between the remote terminal device and the relay terminal device. Specifically, the PKMF network element can determine the remote AUSF network element based on the SUCI, and obtain, from the remote AUSF network element, the root key for communication between the remote terminal device and the relay terminal device.

The foregoing mainly describes the solutions provided in embodiments of this application from a perspective of interaction between network elements. Correspondingly, an embodiment of this application further provides a communication apparatus, and the communication apparatus is configured to implement the foregoing methods. The communication apparatus may be the remote terminal device in the foregoing method embodiments, an apparatus including the remote terminal device, or a chip or a functional module in the remote terminal device. Alternatively, the communication apparatus may be the remote AUSF network element in the foregoing method embodiments, an apparatus including the remote AUSF network element, or a chip or a functional module in the remote AUSF network element. Alternatively, the communication apparatus may be the PKMF network element in the foregoing method embodiments, an apparatus including the PKMF network element, or a chip or a functional module in the PKMF network element.

It may be understood that, to implement the foregoing functions, the communication apparatus includes a hardware structure and/or a software module for performing a corresponding function. A person skilled in the art should easily be aware that, in combination with units and algorithm steps of the examples described in embodiments disclosed in this specification, this application may be implemented by hardware or a combination of the hardware and computer software. Whether a function is performed by the hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the communication apparatus may be divided into function modules based on the foregoing method embodiments. For example, each functional module may be obtained through division based on each corresponding function, or two or more functions may be integrated into one processing module. The integrated module may be implemented in a form of hardware, or may be implemented in a form of a software function module. It is to be noted that, in embodiments of this application, module division is an example, and is merely a logical function division. During actual implementation, another division manner may be used.

Figure 12:
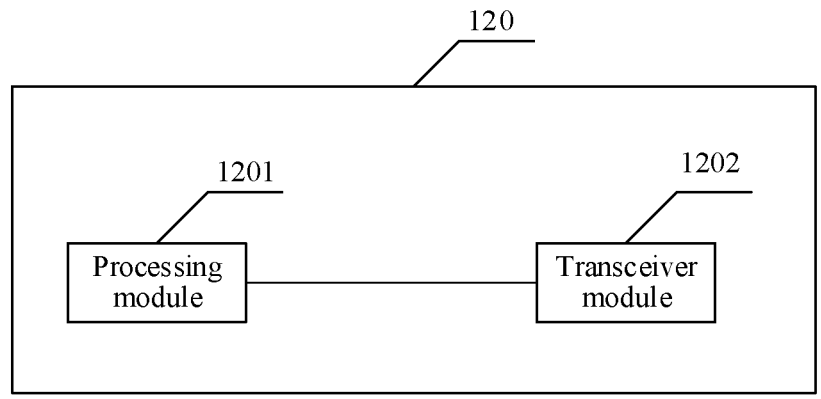
FIG. 12 is a schematic diagram 1 of a structure of a communication apparatus according to an embodiment of this application.

For example, the communication apparatus is the remote terminal device in the foregoing method embodiments. FIG. 12 is a schematic diagram of a structure of a communication apparatus 120. The communication apparatus 120 may be the remote terminal device in FIG. 1. The communication apparatus 120 includes a processing module 1201 and a transceiver module 1202. The processing module 1201 may also be referred to as a processing unit, and is configured to implement a processing function of the remote terminal device in the foregoing method embodiments. For example, the processing module 1201 performs step S502 in FIG. 5: processing functions of the remote terminal device in FIG. 8A and FIG. 8B to FIG. 11A and FIG. 11B. The transceiver module 1202 may also be referred to as a transceiver unit, and is configured to implement a transceiver function of the remote terminal device in the foregoing method embodiments. For example, the transceiver module 1202 performs step S501 in FIG. 5: transceiver functions of the remote terminal device in FIG. 8A and FIG. 8B to FIG. 11A and FIG. 11B. The transceiver module 1202 may be referred to as a transceiver circuit, a transceiver machine, a transceiver, or a communication interface.

For example, the transceiver module 1202 is configured to send a first identifier and a relay service code to a relay terminal device. The first identifier is an identifier that is of the remote terminal device and that is corresponding to the relay service code, or the first identifier is an anonymous identifier of the remote terminal device. The processing module 1201 is configured to generate, based on a first shared key, the relay service code, and at least one first freshness parameter, a root key for communication between the remote terminal device and the relay terminal device. A remote authentication service function network element is an authentication service function network element that serves the remote terminal device, and the first shared key is a key shared between the remote terminal device and the remote authentication service function network element.

In a possible implementation, the first identifier is a SUCI of the remote terminal device.

In a possible implementation, the processing module 1201 and the transceiver module 1202 are further configured to obtain the first identifier.

In a possible implementation, the transceiver module 1202 is further configured to: send the relay service code; and receive the first identifier corresponding to the relay service code.

In a possible implementation, the processing module 1201 is further configured to: generate a temporary identifier based on the first shared key and the relay service code; and obtain the first identifier based on the temporary identifier.

In a possible implementation, the processing module 1201 is further configured to generate the temporary identifier based on the first shared key, the relay service code, and a second freshness parameter.

In a possible implementation, the processing module 1201 is further configured to generate the first identifier based on a second freshness parameter, a route indication, and a home network identifier.

In a possible implementation, the transceiver module 1202 is further configured to: send the relay service code; and receive the second freshness parameter corresponding to the relay service code.

In a possible implementation, the second freshness parameter is a value of a counter locally maintained by the remote terminal device.

In a possible implementation, the first identifier includes the route indication and the home network identifier.

In a possible implementation, the transceiver module 1202 is further configured to send first verification information to the relay terminal device. The first verification information is generated based on a first temporary key and all or some information elements of a message carrying the first verification information, and the first temporary key is generated based on the first shared key.

In a possible implementation, the first temporary key is generated based on the first shared key and at least one of the following: the relay service code, a third freshness parameter, a second identifier of the remote terminal device, and the first identifier, and the third freshness parameter is generated by the remote terminal device. A manner of generating the first temporary key is disclosed in this implementation.

In a possible implementation, the transceiver module 1202 is further configured to send second verification information to the relay terminal device. The second verification information is generated based on the first freshness parameter, the relay service code, and the first shared key.

In a possible implementation, the at least one first freshness parameter includes a first random number, and the transceiver module 1202 is further configured to send the first random number to the relay terminal device. The first random number is sent to the remote AUSF network element or a PKMF network element.

In a possible implementation, the at least one first freshness parameter includes a second random number, and the transceiver module 1202 is further configured to receive the second random number from the relay terminal device. The second random number may be from the remote AUSF network element or the PKMF network element.

In a possible implementation, the at least one first freshness parameter is a value of a counter locally maintained by the remote terminal device.

In a possible implementation, the first shared key is a key Kausf negotiated between the remote terminal device and the remote authentication service function network element when the remote terminal device accesses a network.

In a possible implementation, the processing module 1201 is further configured to: generate a second shared key based on the first shared key and the relay service code, and generate the root key based on the second shared key and the at least one first freshness parameter. The second shared key is a key shared between the remote terminal device and the proximity-based services key management function network element.

Figure 13:
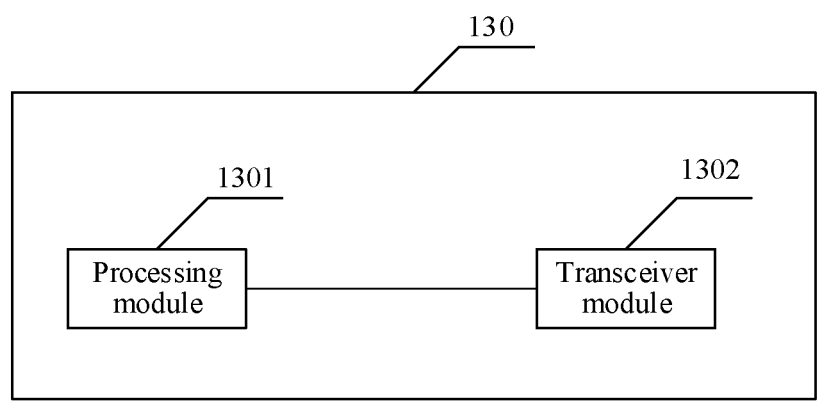
FIG. 13 is a schematic diagram 2 of a structure of a communication apparatus according to an embodiment of this application.

For example, the communication apparatus is the remote AUSF network element in the foregoing method embodiments. FIG. 13 is a schematic diagram of a structure of a communication apparatus 130. The communication apparatus 130 may be the AUSF network element in FIG. 1. The communication apparatus 130 includes a processing module 1301 and a transceiver module 1302. The processing module 1301 may also be referred to as a processing unit, and is configured to implement a processing function of the remote AUSF network element in the foregoing method embodiments: processing functions of the remote AUSF network element in FIG. 8A and FIG. 8B to FIG. 11A and FIG. 11B. For example, the processing module 1301 performs steps S601 to S603 in FIG. 6. The transceiver module 1302 may also be referred to as a transceiver unit, and is configured to implement a transceiver function of the remote AUSF network element in the foregoing method embodiments. For example, the transceiver module 1302 performs steps S601 and S604 in FIG. 6: transceiver functions of the remote AUSF network element in FIG. 8A and FIG. 8B to FIG. 11A and FIG. 11B. The transceiver module 1302 may be referred to as a transceiver circuit, a transceiver machine, a transceiver, or a communication interface.

For example, the processing module 1301 is configured to obtain a relay service code and one of a first identifier or a second identifier of a remote terminal device. The second identifier is a permanent identifier of the remote terminal device, and the first identifier is an identifier that is of the remote terminal device and that is corresponding to the relay service code. The processing module 1301 is further configured to obtain a first shared key corresponding to the first identifier or the second identifier. The first shared key is a key shared between the remote terminal device and the remote authentication service function network element. The remote authentication service function network element generates, based on the first shared key, the relay service code, and at least one first freshness parameter, a root key for communication between the remote terminal device and a relay terminal device. The transceiver module 1302 is configured to send the root key.

In a possible implementation, the transceiver module 1302 is further configured to receive one of the first identifier or the second identifier of the remote terminal device.

In a possible implementation, the processing module 1301 is further configured to: generate a temporary identifier based on the first shared key and the relay service code. The remote authentication service function network element generates the first identifier based on the temporary identifier.

In a possible implementation, the processing module 1301 is further configured to generate the temporary identifier based on the first shared key, the relay service code, and a second freshness parameter.

In a possible implementation, the processing module 1301 is further configured to generate the first identifier based on a second freshness parameter, a route indication, and a home network identifier of the remote terminal device.

In a possible implementation, the second freshness parameter is a value of a counter locally maintained by the remote authentication service function network element.

In a possible implementation, the transceiver module 1302 is further configured to: receive the relay service code; and send the second freshness parameter.

In a possible implementation, the transceiver module 1302 is further configured to: receive the relay service code; and send the first identifier.

In a possible implementation, the first identifier includes the route indication and the home network identifier.

In a possible implementation, the transceiver module 1302 is further configured to receive first verification information. The processing module 1301 is further configured to: generate a first temporary key based on the first shared key: obtain third verification information based on the first temporary key and all or some information elements of a message carrying the first verification information; and compare the first verification information with the third verification information to verify the remote terminal device.

In a possible implementation, the processing module 1301 is further configured to generate the first temporary key based on the first shared key and at least one of the following: the relay service code, a third freshness parameter, the second identifier, and the first identifier of the remote terminal device. The third freshness parameter is generated by the remote terminal device.

In a possible implementation, the at least one first freshness parameter includes a first random number, and the transceiver module 1302 is further configured to receive the first random number.

In a possible implementation, the at least one first freshness parameter includes a second random number, and the transceiver module 1302 is further configured to send the second random number.

In a possible implementation, the at least one first freshness parameter is a value of a counter locally maintained by the remote authentication service function network element.

In a possible implementation, the transceiver module 1302 is further configured to send the first identifier to a unified data management network element.

In a possible implementation, the first shared key is a key Kausf negotiated between the remote terminal device and the remote authentication service function network element when the remote terminal device accesses a network.

Figure 14:
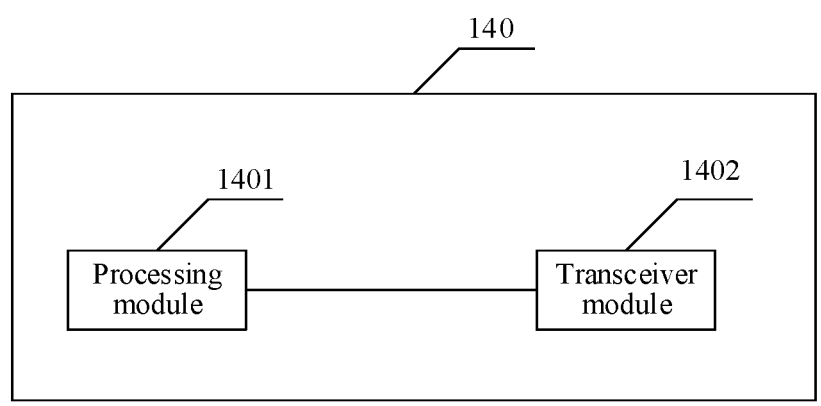
FIG. 14 is a schematic diagram 3 of a structure of a communication apparatus according to an embodiment of this application.

For example, the communication apparatus is the PKMF network element in the foregoing method embodiments. FIG. 14 is a schematic diagram of a structure of a communication apparatus 140. The communication apparatus 140 includes a processing module 1401 and a transceiver module 1402. The processing module 1401 may also be referred to as a processing unit, and is configured to implement a processing function of the PKMF network element in the foregoing method embodiments. For example, the processing module 1401 performs step S702 in FIG. 7: processing functions of the PKMF network element in FIG. 8A and FIG. 8B to FIG. 11A and FIG. 11B. The transceiver module 1402 may also be referred to as a transceiver unit, and is configured to implement a transceiver function of the PKMF network element in the foregoing method embodiments. For example, the transceiver module 1402 performs steps S701 to S703 in FIG. 7: transceiver functions of the PKMF network element in FIG. 8A and FIG. 8B to FIG. 11A and FIG. 11B. The transceiver module 1402 may be referred to as a transceiver circuit, a transceiver machine, a transceiver, or a communication interface.

For example, the transceiver module 1402 is configured to receive a relay service code and a first identifier of a remote terminal device. The first identifier is an identifier that is of the remote terminal device and that is corresponding to the relay service code, or the first identifier is an anonymous identifier of the remote terminal device. The processing module 1401 is configured to obtain, based on the first identifier, a root key for communication between the remote terminal device and a relay terminal device. The root key is generated based on a first shared key, the relay service code, and at least one first freshness parameter, and the first shared key is a key shared between the remote terminal device and a remote authentication service function network element. The transceiver module 1402 is further configured to send the root key.

In a possible implementation, the transceiver module 1402 is further configured to: send the first identifier to a unified data management function network element; receive identification information of the remote authentication service function network element from the unified data management function network element; send the first identifier to the corresponding remote authentication service function network element based on the identification information; and receive the root key from the remote authentication service function network element.

In a possible implementation, the transceiver module 1402 is further configured to: send the first identifier to a unified data management function network element; receive identification information of the remote authentication service function network element and a permanent identifier of the remote terminal device from the unified data management function network element; send the permanent identifier of the remote terminal device to the corresponding remote authentication service function network element based on the identification information; and receive the root key from the remote authentication service function network element.

In a possible implementation, the transceiver module 1402 is further configured to: receive at least one second shared key from the remote authentication service function network element. The second shared key is a key shared between the remote terminal device and the proximity-based services key management function network element, and the second shared key is generated based on the first shared key and the relay service code. The processing module 1401 is further configured to generate, based on the second shared key corresponding to the first identifier and the at least one first freshness parameter, the root key for communication between the remote terminal device and the relay terminal device.

In a possible implementation, the transceiver module 1402 is further configured to receive second verification information. The processing module 1401 is further configured to: generate fourth verification information based on the first freshness parameter and the second shared key; and compare the second verification information with the fourth verification information to verify the remote terminal device.

In a possible implementation, the at least one first freshness parameter includes a first random number, and the transceiver module 1402 is further configured to receive the first random number.

In a possible implementation, the at least one first freshness parameter includes a second random number, and the transceiver module 1402 is further configured to send the second random number.

In a possible implementation, the at least one first freshness parameter is a value of a counter locally maintained by the proximity-based services key management function network element.

In a possible implementation, the first shared key is a key Kausf negotiated between the remote terminal device and the remote authentication service function network element when the remote terminal device accesses a network.

In this embodiment, the communication apparatus is presented in a form of function modules obtained through division in an integration manner. The module herein may be an ASIC, a circuit, a memory and a processor that executes one or more software or firmware programs, an integrated logic circuit, and/or another component capable of providing the foregoing functions.

Specifically, a function/an implementation process of the processing module may be implemented by a processor in the communication apparatus by invoking computer-executable instructions stored in the memory. A function/implementation process of the transceiver module may be implemented by using a transceiver or a communication interface in the communication device.

Because the communication apparatus provided in this embodiment may perform the foregoing methods, for a technical effect that can be achieved by the communication apparatus, refer to the foregoing method embodiments. Details are not described herein again.

Figure 15:
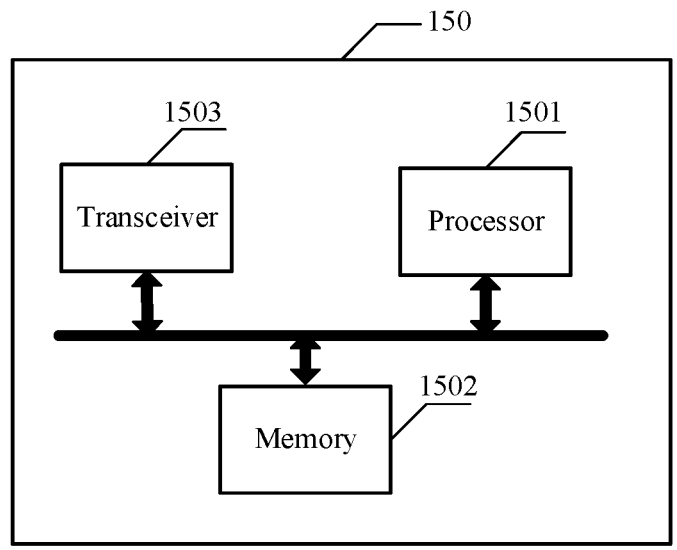
FIG. 15 is a schematic diagram 4 of a structure of a communication apparatus according to an embodiment of this application.

As shown in FIG. 15, an embodiment of this application further provides a communication apparatus. The communication apparatus 150 includes a processor 1501, a memory 1502, and a transceiver 1503. The processor 1501 is coupled to the memory 1502. When the processor 1501 executes a computer program or instructions in the memory 1502, the methods corresponding to the remote terminal device in FIG. 2 to FIG. 11A and FIG. 11B are performed.

Figure 16:
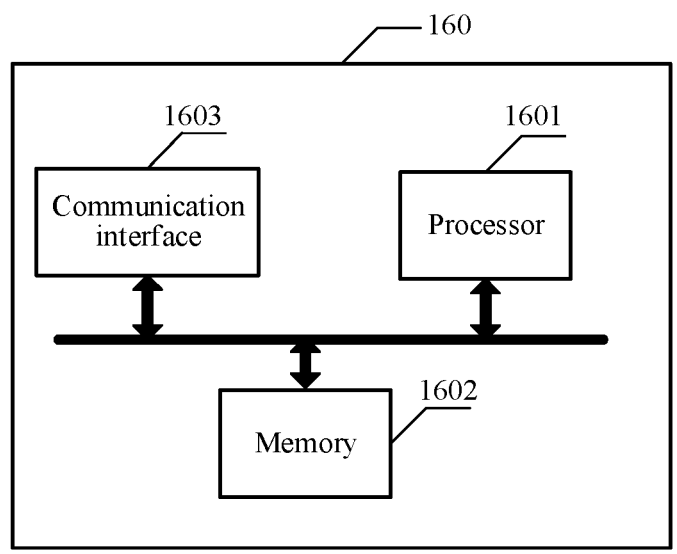
FIG. 16 is a schematic diagram 5 of a structure of a communication apparatus according to an embodiment of this application.

As shown in FIG. 16, an embodiment of this application further provides a communication apparatus. The communication apparatus 160 includes a processor 1601, a memory 1602, and a communication interface 1603. The processor 1601 is coupled to the memory 1602. When the processor 1601 executes a computer program or instructions in the memory 1602, the methods corresponding to the AUSF network element (for example, the remote AUSF network element or the relay AUSF network element) in FIG. 2 to FIG. 11A and FIG. 11B are performed.

Figure 17:
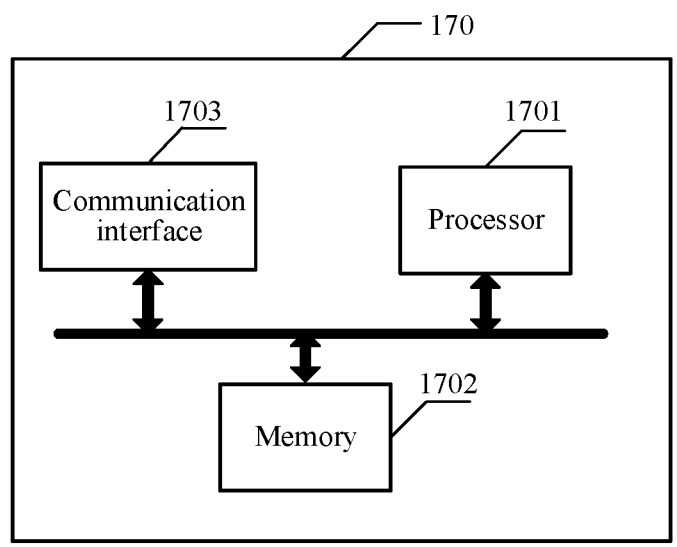
FIG. 17 is a schematic diagram 6 of a structure of a communication apparatus according to an embodiment of this application.

As shown in FIG. 17, an embodiment of this application further provides a communication apparatus. The communication apparatus 170 includes a processor 1701, a memory 1702, and a communication interface 1703. The processor 1701 is coupled to the memory 1702. When the processor 1701 executes a computer program or instructions in the memory 1702, the methods corresponding to the PKMF network element in FIG. 2 to FIG. 11A and FIG. 11B are performed.

An embodiment of this application further provides a computer-readable storage medium. The computer-readable storage medium stores a computer program. When the computer program is run on a computer or a processor, the computer or the processor is enabled to perform the methods corresponding to the remote terminal device in FIG. 2 to FIG. 11A and FIG. 11B.

An embodiment of this application further provides a computer-readable storage medium. The computer-readable storage medium stores a computer program. When the computer program is run on a computer or a processor, the computer or the processor is enabled to perform the methods corresponding to the AUSF network element (for example, the remote AUSF network element or the relay AUSF network element) in FIG. 2 to FIG. 11A and FIG. 11B.

An embodiment of this application further provides a computer-readable storage medium. The computer-readable storage medium stores a computer program. When the computer program is run on a computer or a processor, the computer or the processor is enabled to perform the methods corresponding to the PKMF network element in FIG. 2 to FIG. 11A and FIG. 11B.

An embodiment of this application further provides a computer program product including instructions. When the instructions are run on a computer or a processor, the computer or the processor is enabled to perform the methods corresponding to the remote terminal device in FIG. 2 to FIG. 11A and FIG. 11B.

An embodiment of this application further provides a computer program product including instructions. When the instructions are run on a computer or a processor, the computer or the processor is enabled to perform the methods corresponding to the AUSF network element (for example, the remote AUSF network element or the relay AUSF network element) in FIG. 2 to FIG. 11A and FIG. 11B.

An embodiment of this application further provides a computer program product including instructions. When the instructions are run on a computer or a processor, the computer or the processor is enabled to perform the methods corresponding to the PKMF network element in FIG. 2 to FIG. 11A and FIG. 11B.

An embodiment of this application provides a chip system. The chip system includes a processor, configured to perform the methods corresponding to the remote terminal device in FIG. 2 to FIG. 11A and FIG. 11B, perform the methods corresponding to the AUSF network element (for example, the remote AUSF network element or the relay AUSF network element) in FIG. 2 to FIG. 11A and FIG. 11B, or perform the methods corresponding to the PKMF network element in FIG. 2 to FIG. 11A and FIG. 11B.

In a possible design, the chip system further includes a memory, and the memory is configured to store necessary program instructions and necessary data. The chip system may include a chip and an integrated circuit, or may include the chip and another discrete device. This is not specifically limited in this embodiment of this application.

The communication apparatus, the chip, the computer storage medium, the computer program product, or the chip system provided in this application are all configured to perform the foregoing methods. Therefore, for beneficial effects that can be achieved by the communication apparatus, the chip, the computer storage medium, the computer program product, or the chip system, refer to beneficial effects in the foregoing implementations. Details are not described herein again.

The processor in embodiments of this application may be a chip. For example, the chip may be a field programmable gate array (FPGA), an application-specific integrated chip (ASIC), a system on a chip (SoC), a central processing unit (CPU), a network processor (NP), a digital signal processing circuit (digital signal processor, DSP), a micro controller unit (MCU), a programmable controller (programmable logic device. PLD), or another integrated chip.

The memory in embodiments of this application may be a volatile memory or a non-volatile memory, or may include the volatile memory and the non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), which is used as an external cache. Through examples rather than limitative descriptions. RAMs in many forms may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It is to be noted that the memories in the system and method described in this specification are intended to include but not limited to these memories and any memory of another appropriate type.

It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, device, and method may be implemented in other manners. For example, the foregoing device embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit.

All or some of the foregoing embodiments may be implemented by using software, hardware, firmware, or any combination thereof. When a software program is used to implement embodiments, all or some of embodiments may be implemented in a form of a computer program product. The computer program product includes one or more computer program instructions. When the computer program instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium that can be accessed by a computer, or a data storage device, such as a server or a data center, integrating one or more usable media. The usable medium may be a magnetic medium (for example, a floppy disk, a hard disk drive, or a magnetic tape), an optical medium (for example, a DVD), a semiconductor medium (for example, a solid-state drive (Solid State Disk, SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A key obtaining method, comprising:
sending, by a communication apparatus, a first identifier and a relay service code to a relay terminal device, wherein the first identifier is an anonymous identifier of a remote terminal device; and
generating, by the communication apparatus, a root key for communication between the remote terminal device and the relay terminal device based on a first shared key, the relay service code, and at least one first freshness parameter, wherein the first shared key is a key shared between the remote terminal device and a remote authentication service function network element, wherein the remote authentication service function network element is an authentication service function network element that serves the remote terminal device;
wherein the generating the root key for communication between the remote terminal device and the relay terminal device comprises:
generating, by the communication apparatus, a second shared key based on the first shared key and the relay service code; and
generating, by the communication apparatus, the root key based on the second shared key and the at least one first freshness parameter, wherein the second shared key is a key shared between the remote terminal device and a proximity-based services key management function network element, wherein the proximity-based services key management function network element is a network element configured to manage security information of proximity-based services.

2. The method according to claim 1, wherein the first identifier is a subscription concealed identifier (SUCI) of the remote terminal device.

3. The method according to claim 1, wherein the at least one first freshness parameter comprises a first random number, and the method further comprises:
sending, by the communication apparatus, the first random number to the relay terminal device.

4. The method according to claim 1, wherein the at least one first freshness parameter comprises a second random number, and the method further comprises:
receiving, by the communication apparatus, the second random number from the relay terminal device.

5. The method according to claim 1, wherein the first shared key is a key negotiated between the remote terminal device and the remote authentication service function network element when the remote terminal device accesses a network.

6. The method according to claim 1, wherein the communication apparatus is the remote terminal device, or an apparatus including the remote terminal device, or a chip in the remote terminal device, or a functional component in the remote terminal device.

7. A key obtaining method, comprising:
obtaining, by a communication apparatus, a relay service code and a second identifier of a remote terminal device, wherein the second identifier is a permanent identifier of the remote terminal device;
obtaining, by the communication apparatus, a first shared key corresponding to the second identifier, wherein the first shared key is a key shared between the remote terminal device and a remote authentication service function network element, wherein the remote authentication service function network element is an authentication service function network element that serves the remote terminal device;
generating, by the communication apparatus, a root key for communication between the remote terminal device and a relay terminal device based on the first shared key, the relay service code, and at least one first freshness parameter; and
sending, by the communication apparatus, the root key;
wherein the generating the root key for communication between the remote terminal device and the relay terminal device comprises:
generating, by the communication apparatus, a second shared key based on the first shared key and the relay service code; and
generating, by the communication apparatus, the root key based on the second shared key and the at least one first freshness parameter, wherein the second shared key is a key shared between the remote terminal device and a proximity-based services key management function network element, wherein the proximity-based services key management function network element is a network element configured to manage security information of proximity-based services.

8. The method according to claim 7, further comprising:
sending, by the communication apparatus, the second shared key to the proximity-based services key management function network element.

9. The method according to claim 8, further comprising:
receiving, by the proximity-based services key management function network element, the second shared key from the communication apparatus.

10. The method according to claim 8, further comprising:
receiving, by the proximity-based services key management function network element, the second shared key.

11. The method according to claim 7, wherein the sending, by the communication apparatus, the root key comprises:
sending, by the communication apparatus, the root key to the relay terminal device.

12. The method according to claim 7, wherein the at least one first freshness parameter comprises a first random number, and the method further comprises:
receiving, by the communication apparatus, the first random number.

13. The method according to claim 7, wherein the at least one first freshness parameter comprises a second random number, and the method further comprises:
sending, by the communication apparatus, the second random number.

14. The method according to claim 7, wherein the first shared key is a key negotiated between the remote terminal device and the remote authentication service function network element when the remote terminal device accesses a network.

15. The method according to claim 7, wherein the communication apparatus is the remote authentication service function network element, or an apparatus including the remote authentication service function network element, or a chip in the remote authentication service function network element, or a functional component in the remote authentication service function network element.

16. A communication apparatus, comprising:
a processor, wherein the processor is coupled to a memory storing a computer program, and the processor is configured to execute the computer program to enable the communication apparatus to perform operations comprising:
sending a first identifier and a relay service code to a relay terminal device, wherein the first identifier is an anonymous identifier of a remote terminal device; and
generating a root key for communication between the remote terminal device and the relay terminal device based on a first shared key, the relay service code, and at least one first freshness parameter, wherein the first shared key is a key shared between the remote terminal device and a remote authentication service function network element, wherein remote authentication service function network element is an authentication service function network element that serves the remote terminal device;
wherein the generating the root key for communication between the remote terminal device and the relay terminal device comprises:
generating a second shared key based on the first shared key and the relay service code; and
generating the root key based on the second shared key and the at least one first freshness parameter, wherein the second shared key is a key shared between the remote terminal device and a proximity-based services key management function network element, wherein the proximity-based services key management function network element is a network element configured to manage security information of proximity-based services.

17. The communication apparatus according to claim 16, wherein the first identifier is a subscription concealed identifier (SUCI) of the remote terminal device.

18. The communication apparatus according to claim 16, wherein the at least one first freshness parameter comprises a first random number, and the operations further comprise:
sending the first random number to the relay terminal device.

19. The communication apparatus according to claim 16, wherein the at least one first freshness parameter comprises a second random number, and the operations further comprise:
receiving the second random number from the relay terminal device.

20. The communication apparatus according to claim 16, wherein the first shared key is a key negotiated between the remote terminal device and the remote authentication service function network element when the remote terminal device accesses a network.

21. The communication apparatus according to claim 16, wherein the communication apparatus is the remote terminal device, or an apparatus including the remote terminal device, or a chip in the remote terminal device, or a functional component in the remote terminal device.

22. A communication apparatus, comprising:
a processor, wherein the processor is coupled to a memory storing a computer program, and the processor is configured to execute the computer program to enable the communication apparatus to perform operations comprising:
obtaining a relay service code and a second identifier of a remote terminal device, wherein the second identifier is a permanent identifier of the remote terminal device;
obtaining a first shared key corresponding to the second identifier, wherein the first shared key is a key shared between the remote terminal device and a remote authentication service function network element, wherein the remote authentication service function network element is an authentication service function network element that serves the remote terminal device;
generating a root key for communication between the remote terminal device and a relay terminal device based on the first shared key, the relay service code, and at least one first freshness parameter; and
sending the root key;
wherein the generating the root key for communication between the remote terminal device and the relay terminal device comprises:
generating a second shared key based on the first shared key and the relay service code; and
generating the root key based on the second shared key and the at least one first freshness parameter, wherein the second shared key is a key shared between the remote terminal device and a proximity-based services key management function network element, wherein the proximity-based services key management function network element is a network element configured to manage security information of proximity-based services.

23. The communication apparatus according to claim 22, wherein the operations further comprise:
sending the second shared key to the proximity-based services key management function network element.

24. The communication apparatus according to claim 22, wherein the sending the root key comprises:
sending the root key to the relay terminal device.

25. The communication apparatus according to claim 22, wherein the at least one first freshness parameter comprises a first random number, and the operations further comprise:
receiving the first random number.

26. The communication apparatus according to claim 22, wherein the at least one first freshness parameter comprises a second random number, and the operations further comprise:
sending the second random number.

27. The communication apparatus according to claim 22, wherein the first shared key is a key negotiated between the remote terminal device and the remote authentication service function network element when the remote terminal device accesses a network.

28. The communication apparatus according to claim 22, wherein the communication apparatus is the remote authentication service function network element, or an apparatus including the remote authentication service function network element, or a chip in the remote authentication service function network element, or a functional component in the remote authentication service function network element.

29. A system, comprising:
a remote authentication service function network element, wherein the remote authentication service function network element is an authentication service function network element that serves a remote terminal device; and
a proximity-based services key management function network element, wherein the proximity-based services key management function network element is a network element configured to manage security information of proximity-based services;
wherein the remote authentication service function network element includes a processor configured to:
obtain a relay service code and a second identifier of the remote terminal device, wherein the second identifier is a permanent identifier of the remote terminal device;
obtain a first shared key corresponding to the second identifier, wherein the first shared key is a key shared between the remote terminal device and a remote authentication service function network element;
generate a root key for communication between the remote terminal device and a relay terminal device based on the first shared key, the relay service code, and at least one first freshness parameter, wherein the generating the root key for communication between the remote terminal device and the relay terminal device comprises:
generating a second shared key based on the first shared key and the relay service code; and
generating the root key based on the second shared key and the at least one first freshness parameter, wherein the second shared key is a key shared between the remote terminal device and the proximity-based services key management function network element;
send the root key; and
send the second shared key to the proximity-based services key management function network element; and
wherein the proximity-based services key management function network element includes a processor configured to:
receive the second shared key.

* * * * *